United States Patent
Alapati et al.

(10) Patent No.: US 12,216,518 B2
(45) Date of Patent: Feb. 4, 2025

(54) POWER SAVING IN A NETWORK DEVICE

(71) Applicant: Marvell Asia Pte Ltd, Singapore (SG)

(72) Inventors: Ashwin Alapati, San Jose, CA (US); Ajit Jain, Milpitas, CA (US); Srinivas Gangam, Milpitas, CA (US)

(73) Assignee: Marvell Asia Pte Ltd, Singapore (SG)

( * ) Notice: Subject to any disclaimer, the term of this patent is extended or adjusted under 35 U.S.C. 154(b) by 43 days.

(21) Appl. No.: 18/113,497

(22) Filed: Feb. 23, 2023

(65) Prior Publication Data

US 2024/0288923 A1 Aug. 29, 2024

(51) Int. Cl.
G06F 1/32 (2019.01)
G06F 1/3209 (2019.01)
G06F 1/3203 (2019.01)

(52) U.S. Cl.
CPC .......... G06F 1/3209 (2013.01); G06F 1/3203 (2013.01)

(58) Field of Classification Search
CPC .................................................. G06F 1/3209
USPC .......................................................... 713/323
See application file for complete search history.

(56) References Cited

U.S. PATENT DOCUMENTS

| | | | | |
|---|---|---|---|---|
| 6,549,595 B1 * | 4/2003 | Den Besten | .......... | H04L 7/0008 375/360 |
| 8,073,669 B2 | 12/2011 | Fernsler | | |
| 8,327,056 B1 * | 12/2012 | Chan | .......... | G06F 1/3237 710/56 |
| 8,989,202 B2 * | 3/2015 | Davis | .......... | H04L 49/1546 370/463 |
| 9,001,658 B2 * | 4/2015 | Dorize | .......... | G06F 1/3209 370/252 |
| 2003/0165277 A1 * | 9/2003 | Ohashi | .......... | H04N 19/61 375/240 |
| 2004/0174906 A1 * | 9/2004 | Ohkuma | .......... | H04L 69/28 370/503 |
| 2010/0316099 A1 * | 12/2010 | Sugita | .......... | G06F 1/3287 375/219 |
| 2012/0139590 A1 * | 6/2012 | Myers | .......... | G06F 1/3237 327/113 |

(Continued)

OTHER PUBLICATIONS

Arar, "How to Reduce Power Consumption with Clock Gating," available at https://www.allaboutcircuits.com/technical-articles/use-of-clock-gating-to-reduce-power-consumption, Mar. 8, 2018 (12 pages).

(Continued)

*Primary Examiner* — Volvick Derose

(57) ABSTRACT

A first component of a network device determines that the first component is to provide packet data to a second component of the network device for processing by the second component. In connection with determining that the first component is to provide packet data to the second component of the network device, the first component prompts the second component to activate a clock network of the second component. In connection with prompting the second component to activate the clock network, the first component sends the packet data to the second component to be processed by the second component. The first component determines when the second component has completed processing of the packet data, and prompts the second component to deactivate the clock network in response to determining that the second component has completed processing of the packet data.

18 Claims, 12 Drawing Sheets

(56) References Cited

U.S. PATENT DOCUMENTS

| | | | |
|---|---|---|---|
| 2014/0063343 A1* | 3/2014 | Goff | G06F 1/10 |
| | | | 348/521 |
| 2014/0157017 A1* | 6/2014 | Zhang | H04W 52/0225 |
| | | | 713/320 |
| 2015/0242348 A1* | 8/2015 | Levy | G06F 1/04 |
| | | | 710/110 |
| 2018/0175882 A1 | 6/2018 | Hanham | |
| 2023/0171721 A1* | 6/2023 | Qu | H04W 56/0015 |
| | | | 370/329 |
| 2024/0007776 A1* | 1/2024 | Nagoshi | H04L 12/44 |

OTHER PUBLICATIONS

Khan, "Introduction to System-on-Chip," Toronto Metropolitan University, available at https://www.ecb.torontomu.ca/~courses/coe838/lectures/Intro-SoC.pdf, downloaded on Jul. 19, 2023 (34 pages).

* cited by examiner

POWER SAVING IN A NETWORK DEVICE

FIELD OF TECHNOLOGY

The present disclosure relates generally to communication networks, and more particularly to power saving techniques for use within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, a switch, a bridge, a router, a server, a gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a Transmission Control Protocol (TCP) segment or a User Datagram Protocol (UDP) datagram. The Open Systems Interconnection (OSI) model of communications describes these and other layers of communications. However, other models defining other ways of layering information may also be used. The Internet Protocol (IP) suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, a virtual local area network (VLAN) identifier, path information, etc., is typically used to determine how to handle a data unit (i.e., what actions to take with respect to the data unit). For instance, an IP data packet may include a destination IP address field within the header of the IP data packet, based upon which a network router may determine one or more other networking devices, among a number of possible other networking devices, to which the IP data packet is to be forwarded.

In facilities with high numbers of network devices, such as server farms, data centers, etc., the collective amount of power consumed by the network devices is significant. It is therefore advantageous to reduce the amount of power consumed by individual network devices.

SUMMARY

In an embodiment, a method for power saving in a network device includes: determining, at a first component of the network device, that the first component is to provide packet data to a second component of the network device for processing by the second component; in connection with determining that the first component is to provide packet data to the second component of the network device, prompting, by the first component, the second component to activate a clock network of the second component; in connection with prompting the second component to activate the clock network, sending the packet data from the first component to the second component to be processed by the second component; determining, at the first component, when the second component has completed processing of the packet data; and in response to determining that the second component has completed processing of the packet data, prompting, by the first component, the second component to deactivate the clock network.

In another embodiment, a method for power saving in a network device includes: determining, at a component of the network device, that the component is to retrieve packet data stored in a memory of the network device; in connection with determining that the component is to is to retrieve packet data stored in the memory of the network device, prompting, by the component, the memory to activate a clock network of the memory; in connection with prompting the memory to activate the clock network, sending a read command from the component to the memory to be processed by the memory; determining, at the component, when the memory has completed processing of the read command; and in response to determining that the memory has completed processing of the read command, prompting, by the component, the memory to deactivate the clock network.

In yet another embodiment, a network device comprises: a memory configured to store packet data corresponding to packets received via a plurality of network interfaces of the network device; a packet processor configured to process packets received via the plurality of network interfaces of the network device, the packet processor including a clock network; and circuitry configured to: manage queues in the memory, selectively release to the packet processor packet data in queues in the memory for processing by the packet processor, in connection with determining that packet data is to be released to the packet processor, prompt the packet processor to activate the clock network of the packet processor, in connection with prompting the packet processor to activate the clock network, releasing the packet data to the packet processor, determine when the packet processor has completed processing of the packet data, and in response to determining that the packet processor has completed processing of the packet data, prompt the packet processor to deactivate the clock network.

DETAILED DESCRIPTION

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Approaches, techniques, and mechanisms are disclosed for more optimally reducing power consumption in a network device, such as within a switch or router.

Figure 1:
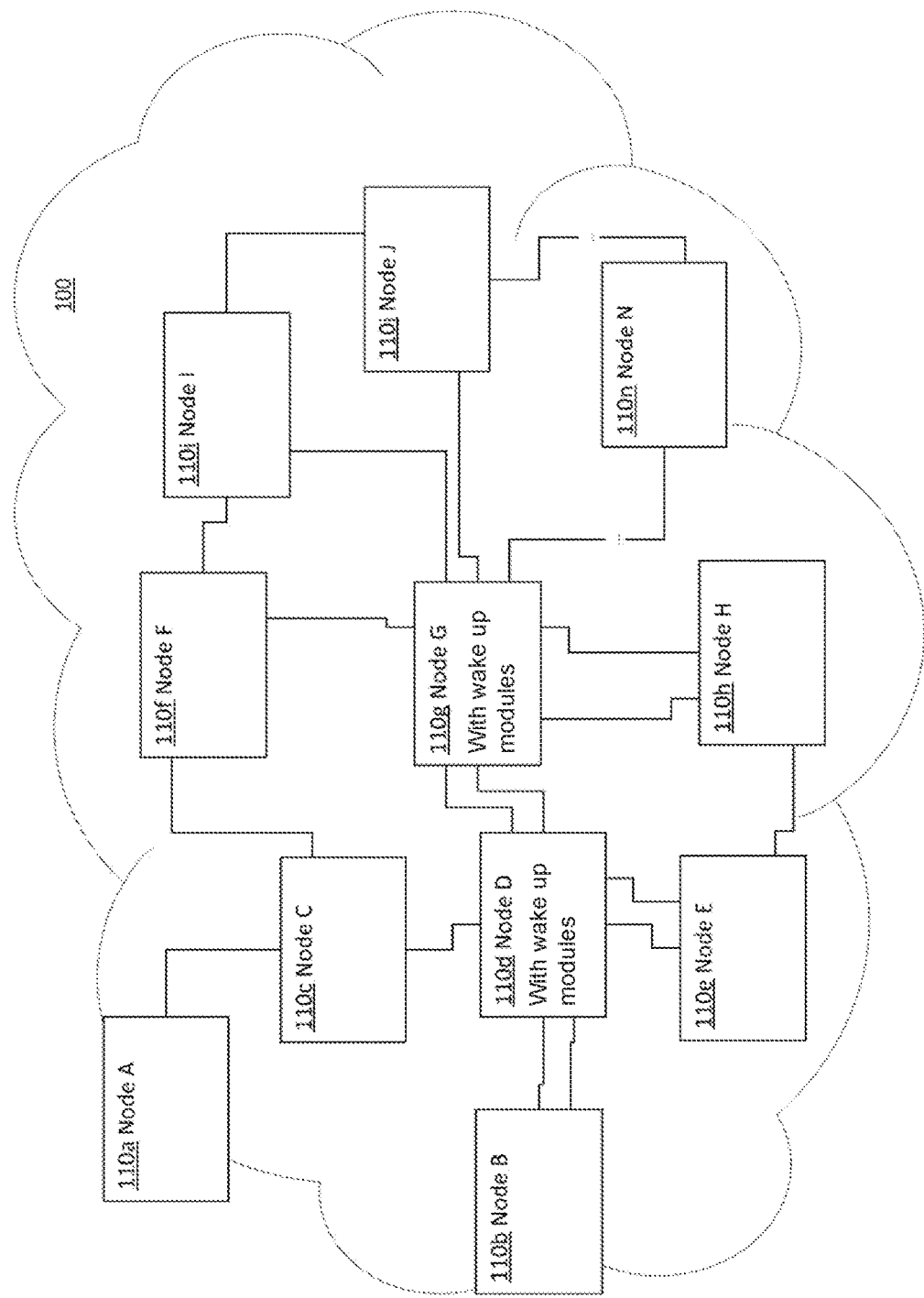
FIG. 1 is a simplified diagram of an example networking system in which power saving techniques described herein are practiced, according to an embodiment.

FIG. 1 is a simplified diagram of an example networking system 100, also referred to as a network, in which power saving techniques described herein are practiced, according to an embodiment. Networking system 100 comprises a plurality of interconnected nodes 110a-110n(collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing machine-readable instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

While each node 110 may or may not have a variety of other functions, in an embodiment, each node 110 is configured to send, receive, and/or relay data to one or more other nodes 110 via communication links. In general, data is communicated as a series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g., a TCP segment) to a second node 110 over a path that includes an intermediate node 110. The data unit may be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g., packets or frames)

and route those subunits to the second node 110 without ever composing the entire original data unit.

When a node 110 receives a data unit, it typically examines addressing information within the data unit (and/or other information within the data unit) to determine how to process the data unit. The addressing information may include, for instance, a media access control (MAC) address, an IP address, a VLAN identifier, information within a multi-protocol label switching (MPLS) label, or any other suitable information. If the addressing information indicates that the receiving node 110 is not the destination for the data unit, the node may look up forwarding information within a forwarding database of the receiving node 110 and forward the data unit to one or more other nodes 110 connected to the receiving node 110 based on the forwarding information. The forwarding information may indicate, for instance, an outgoing port over which to send the data unit, a header to attach to the data unit, a new destination address to overwrite in the data unit, etc. In cases where multiple paths to the destination node 110 are possible, the forwarding information may include information indicating a suitable approach for selecting one of those paths, or a path deemed to be the best path may already be defined.

Addressing information, flags, labels, and other metadata used for determining how to handle a data unit are typically embedded within a portion of the data unit known as the header. One or more headers are typically at the beginning of the data unit, and are followed by the payload of the data unit. For example, a first data unit having a first header corresponding to a first communication protocol may be encapsulated in a second data unit at least by appending a second header to the first data unit, the second header corresponding to a second communication protocol. For example, the second communication protocol is below the first communication protocol in a protocol stack, in some embodiments.

A header has a structure defined by a communication protocol and comprises fields of different types, such as a destination address field, a source address field, a destination port field, a source port field, and so forth, according to some embodiments. In some protocols, the number and the arrangement of fields is fixed. Other protocols allow for variable numbers of fields and/or variable length fields with some or all of the fields being preceded by type information that indicates to a node the meaning of the field and/or length information that indicates a length of the field. In some embodiments, a communication protocol defines a header having multiple different formats and one or more values of one or more respective fields in the header indicate to a node the format of the header. For example, a header includes a type field, a version field, etc., that indicates to which one of multiple formats that header conforms.

Different communication protocols typically define respective headers having respective formats.

For convenience, data units are sometimes referred to herein as "packets," which is a term often used to refer to data units defined by the IP. The approaches, techniques, and mechanisms described herein, however, are applicable to data units defined by suitable communication protocols other than the IP. Thus, unless otherwise stated or apparent, the term "packet" as used herein should be understood to refer to any type of data structure communicated across a network, including packets as well as segments, cells, data frames, datagrams, and so forth.

Any node in the depicted network 100 may communicate with any other node in the network 100 by sending packets through a series of nodes 110 and links, referred to as a path.

For example, Node B (110*b*) may send packets to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g., via which one or more egress ports should send the packet be transmitted). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110, according to some embodiments. In this manner, the actual path of a packet is product of each node 110 along the path making routing decisions about how best to move the packet along to the destination node 110 identified by the packet, according to some embodiments.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

One or more of the nodes 110 utilize power saving techniques, examples of which are described below. For example, FIG. 1 depicts node 110*d* and node 110*g* as having wake up modules that utilize power saving techniques described below.

Figure 2:
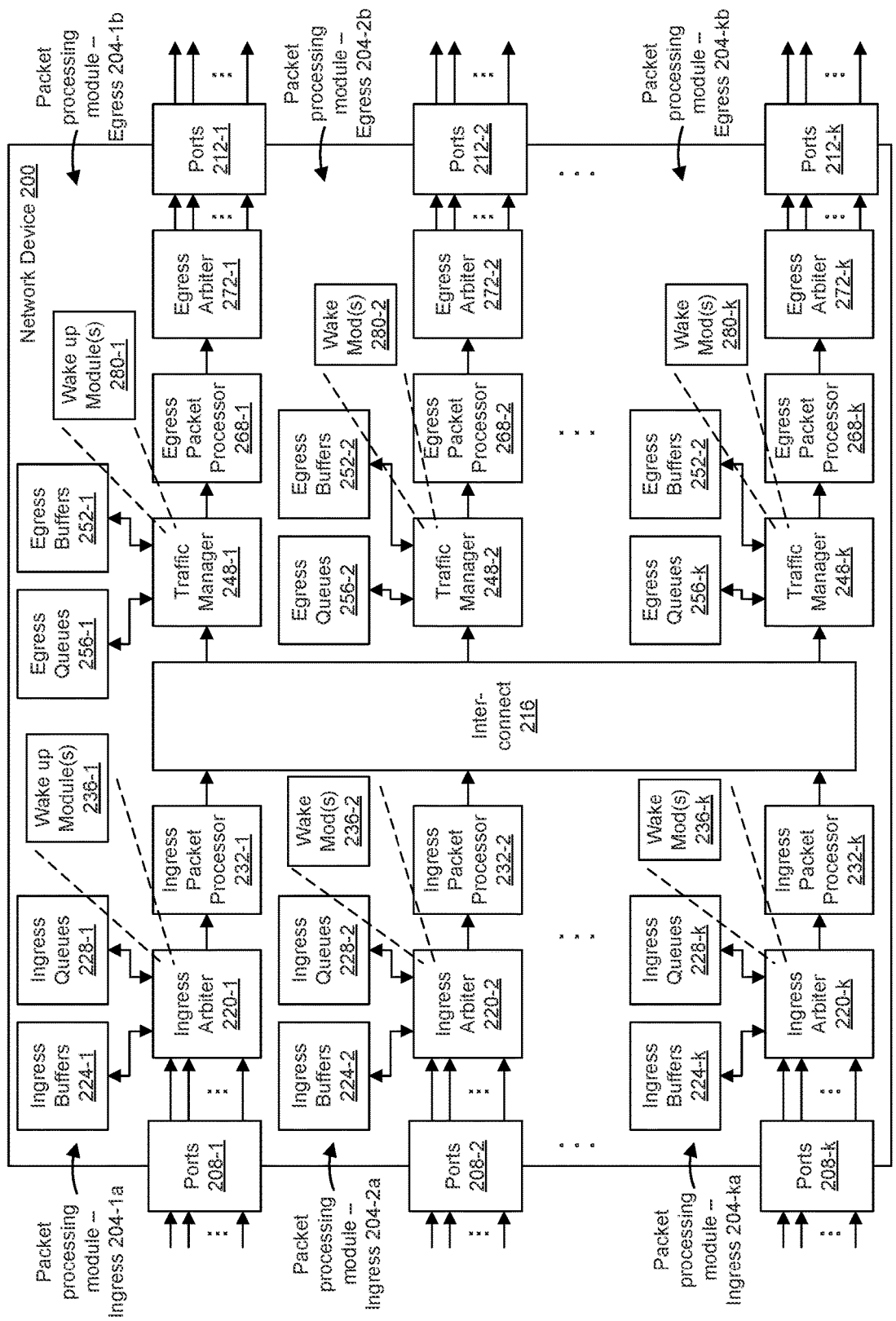
FIG. 2 is a simplified diagram of an example network device in which power saving techniques are utilized, according to an embodiment.

FIG. 2 is a simplified diagram of an example network device 200 in which progressive queue pacing techniques are utilized, according to an embodiment. The network device 200 is a computing device comprising any combination of i) hardware and/or ii) one or more processors executing machine-readable instructions, being configured to implement the various logical components described herein.

In some embodiments, the node 110*d* and node 110*g* of FIG. 1 have a structure the same as or similar to the network device 200. In another embodiment, the network device 200 may be one of a number of components within a node 110. For instance, network device 200 may be implemented on one or more integrated circuits, or "chips," configured to perform switching and/or routing functions within a node 110, such as a network switch, a router, etc. The node 110 may further comprise one or more other components, such as one or more central processor units, storage units, memories, physical interfaces, LED displays, or other components external to the one or more chips, some or all of which may communicate with the one or more chips. In some such embodiments, the node 110 comprises multiple network devices 200.

In other embodiments, the network device 200 is utilized in a suitable networking system different than the example networking system 100 of FIG. 1.

The network device 200 includes a plurality of packet processing modules 204, with each packet processing module being associated with a respective plurality of ingress network interfaces 208 (sometimes referred to herein as "ingress ports" for purposes of brevity) and a respective plurality of egress network interfaces 212 (sometimes referred to herein as "egress ports" for purposes of brevity). The ingress ports 208 are ports by which packets are received via communication links in a communication network, and the egress ports 212 are ports by which at least some of the packets are transmitted via the communication links after having been processed by the network device 200.

Although the term "packet" is used to describe the data units processed by the network device 200, the data units may be packets, cells, frames, or other suitable structures. For example, in some embodiments the individual atomic data units upon which the depicted components operate are cells or frames. That is, data units are received, acted upon, and transmitted at the cell or frame level, in some such embodiments. These cells or frames are logically linked together as the packets to which they respectively belong for purposes of determining how to handle the cells or frames, in some embodiments. However, the cells or frames are not actually assembled into packets within device 200, particularly if the cells or frames are being forwarded to another destination through device 200, in some embodiments.

Ingress ports 208 and egress ports 212 are depicted as separate ports for illustrative purposes, but typically correspond to the same physical network interfaces of the network device 200. That is, a single network interface acts as both an ingress port 208 and an egress port 212, in some embodiments. Nonetheless, for various functional purposes, certain logic of the network device 200 may view a single physical network interface as logically being a separate ingress port 208 and egress port 212. Moreover, for various functional purposes, certain logic of the network device 200 may subdivide a single physical network interface into multiple ingress ports 208 or egress ports 212 (e.g., "virtual ports"), or aggregate multiple physical network interfaces into a single ingress port 208 or egress port 212 (e.g., a trunk, a link aggregate group (LAG), an equal cost multipath (ECMP) group, etc.). Hence, in various embodiments, ingress ports 208 and egress ports 212 are considered distinct logical constructs that are mapped to physical network interfaces rather than simply as distinct physical constructs.

In some embodiments, at least some ports 208/212 are coupled to one or more transceivers (not shown in FIG. 2), such as Serializer/Deserializer ("SerDes") blocks. For instance, ingress ports 208 provide serial inputs of received data units into a SerDes block, which then outputs the data units in parallel into a packet processing module 204. On the other end, a packet processing module 204 provides data units in parallel into another SerDes block, which outputs the data units serially to egress ports 212. There may be any number of input and output SerDes blocks, of any suitable size, depending on the specific implementation (e.g., four groups of 4×25 gigabit blocks, eight groups of 4×100 gigabit blocks, etc.).

Each packet processing module 204 comprises an ingress portion 204-*xa* and an egress portion 204-*xb*. The ingress portion 204-*xa* generally performs ingress processing operations for packets such as one of, or any suitable combination of two or more of: packet classification, tunnel termination, Layer-2 (L2) forwarding lookups, Layer-3 (L3) forwarding lookups, etc.

The egress portion 204-*xb* generally performs egress processing operations for packets such as one of, or any suitable combination of two or more of: packet duplication (e.g., for multicast packets), header alteration, rate limiting, traffic shaping, egress policing, flow control, maintaining statistics regarding packets, etc.

Each ingress portion 204-*xa* is communicatively coupled to multiple egress portions 204-*xb* via an interconnect 216. Similarly, each egress portion 204-*xb* is communicatively coupled to multiple ingress portions 204-*xa* via the interconnect 216. The interconnect 216 comprises one or more switching fabrics, one or more crossbars, etc., according to various embodiments.

In operation, an ingress portion 204-*xa* receives a packet via an associated ingress port 208 and performs ingress processing operations for the packet, including determining one or more egress ports 212 via which the packet is to be transmitted (sometimes referred to herein as "target ports"). The ingress portion 204-*xa* then transfers the packet, via the interconnect 216, to one or more egress portion 204-*xb* corresponding to the determined one or more target ports 212. Each egress portion 204-*xb* that receives the packet performs egress processing operations for the packet and then transfers the packet to one or more determined target ports 212 associated with the egress portion 204-*xb* for transmission from the network device 200.

In some embodiments, the ingress portion 204-*xa* determines a virtual target port and one or more egress portions 204-*xb* corresponding to the virtual target port map the virtual target portion to one or more physical egress ports 212. In some embodiments, the ingress portion 204-*xa* determines a group of target ports 212 (e.g., a trunk, a LAG, an ECMP group, etc.) and one or more egress portions 204-*xb* corresponding to the group of target ports selects one or more particular target egress ports 212 within the group of target ports. In the present disclosure, the term "target port" refers to a physical port, a virtual port, a group of target ports, etc., unless otherwise stated or apparent.

Each packet processing module 204 is implemented using any suitable combination of fixed circuitry and/or a processor executing machine-readable instructions, such as specific logic components implemented by one or more FPGAs, ASICs, or one or more processors executing machine-readable instructions, according to various embodiments.

In some embodiments, at least respective portions of multiple packet processing modules 204 are implemented on a single IC (or "chip"). In some embodiments, respective portions of multiple packet processing modules 204 are implemented on different respective chips.

In an embodiment, components of each ingress portion 204-*xa* are arranged in a pipeline such that outputs of one or more components are provided as inputs to one or more other components. In some embodiments in which the components are arranged in a pipeline, one or more components of the ingress portion 204-*xa* are skipped or bypassed for certain packets. In other embodiments, the components are arranged in a suitable manner that is not a pipeline. The exact set and/or sequence of components that process a given packet may vary, in some embodiments, depending on the attributes of the packet and/or the state of the network device 200, in some embodiments.

Similarly, in an embodiment, components of each egress portion 204-*xb* are arranged in a pipeline such that outputs of one or more components are provided as inputs to one or more other components. In some embodiments in which the components are arranged in a pipeline, one or more components of the egress portion 204-*xb* are skipped or bypassed for certain packets. In other embodiments, the components are arranged in a suitable manner that is not a pipeline. The exact set and/or sequence of components that process a given packet may vary, in some embodiments, depending on the attributes of the packet and/or the state of the network device 200, in some embodiments.

Each ingress portion 204-*xa* includes circuitry 220 (sometimes referred to herein as "ingress arbitration circuitry") that is configured to reduce traffic loss during periods of bursty traffic and/or other congestion. In some embodiments, the ingress arbitration circuitry 220 is configured to function in a manner that facilitates economization of the sizes, numbers, and/or qualities of downstream components within the packet processing module 204 by more intelligently controlling the release of data units to these components. In some embodiments, the ingress arbitration circuitry 220 is further configured to support features such as lossless protocols and cut-through switching while still permitting high rate bursts from ports 208.

The ingress arbitration circuitry 220 is coupled to an ingress buffer memory 224 that is configured to temporarily store packets that are received via the ports 208 while components of the packet processing module 204 process the packets.

Each data unit received by the ingress portion 204-*xa* is stored in one or more entries within one or more buffers, which entries are marked as utilized to prevent newly received data units from overwriting data units that are already buffered in the buffer memory 224. After a data unit is released to an egress portion 204-*xb*, the one or more entries in which a data unit is buffered in the ingress buffer memory 224 are then marked as available for storing newly received data units, in some embodiments.

Each buffer may be a portion of any suitable type of memory, including volatile memory and/or non-volatile memory. In an embodiment, the ingress buffer memory 224 comprises a single-ported memory that supports only a single input/output (I/O) operation per clock cycle (i.e., either a single read operation or a single write operation). Single-ported memories are utilized for higher operating frequency, though in other embodiments multi-ported memories are used instead. In an embodiment, the ingress buffer memory 224 comprises multiple physical memories that are capable of being accessed concurrently in a same clock cycle, though full realization of this capability is not necessary. In an embodiment, each buffer is a distinct memory bank, or set of memory banks. In yet other embodiments, different buffers are different regions within a single memory bank. In an embodiment, each buffer comprises many addressable "slots" or "entries" (e.g., rows, columns, etc.) in which data units, or portions thereof, may be stored.

Generally, buffers in the ingress buffer memory 224 comprises a variety of buffers or sets of buffers, each utilized for varying purposes and/or components within the ingress portion 204-*xa*.

The ingress portion 204-*xa* comprises a buffer manager (not shown) that is configured to manage use of the ingress buffers 224. The buffer manager performs, for example, one of or any suitable combination of the following: allocates and deallocates specific segments of memory for buffers, creates and deletes buffers within that memory, identifies available buffer entries in which to store a data unit, maintains a mapping of buffers entries to data units stored in those buffers entries (e.g., by a packet sequence number assigned to each packet when the first the first data unit in that packet was received), marks a buffer entry as available when a data unit stored in that buffer is dropped, sent, or released from the buffer, determines when a data unit is to be dropped because it cannot be stored in a buffer, performs garbage collection on buffer entries for data units (or portions thereof) that are no longer needed, etc., in various embodiments.

The buffer manager includes buffer assignment logic (not shown) that is configured to identify which buffer, among multiple buffers in the ingress buffer memory 224, should be utilized to store a given data unit, or portion thereof, according to an embodiment. In some embodiments, each packet is stored in a single entry within its assigned buffer. In yet other embodiments, a packet is received as, or divided into, constituent data units such as fixed-size cells or frames, and the constituent data units are stored separately (e.g., not in the same location, or even the same buffer).

The ingress arbitration circuitry 220 is also configured to maintain ingress queues 228, according to some embodiments, which are used to manage the order in which data units are processed from the buffers in the ingress buffer memory 224. Each data unit, or the buffer locations(s) in which the data unit is stored, is said to belong to one or more constructs referred to as queues. Typically, a queue is a set of memory locations (e.g., in the ingress buffer memory 224) arranged in some order by metadata describing the queue. The memory locations may (and often are) non-contiguous relative to their addressing scheme and/or physical or logical arrangement.

In some embodiments, the sequence of constituent data units as arranged in a queue generally corresponds to an order in which the data units or data unit portions in the queue will be released and processed. Such queues are known as first-in-first-out ("FIFO") queues, though in other embodiments other types of queues may be utilized.

The ingress portion 204-*xa* also includes an ingress packet processor 232 that is configured to perform ingress processing operations for packets such as one of, or any suitable combination of two or more of: packet classification, tunnel termination, L2 forwarding lookups, L3 forwarding lookups, etc., according to various embodiments. For example, the ingress packet processor 232 includes an L2 forwarding database and/or an L3 forwarding database, and the ingress packet processor 232 performs L2 forwarding lookups and/or L3 forwarding lookups to determine target ports for packets. In some embodiments, the ingress packet processor 232 uses header information in packets to perform L2 forwarding lookups and/or L3 forwarding lookups.

The ingress arbitration circuitry 220 is configured to release a certain number of data units (or portions of data units) from ingress queues 228 for processing (e.g., by the ingress packet processor 232) or for transfer (e.g., via the interconnect 216) each clock cycle or other defined period of time. The next data unit (or portion of a data unit) to release may be identified using one or more ingress queues 228. For instance, respective ingress ports 208 (or respective groups of ingress ports 208) are assigned to respective ingress queues 228, and the ingress arbitration circuitry 220 selects queues 228 from which to release one or more data units (or portions of data units) according to a selection scheme, such as a round-robin scheme or another suitable selection scheme, in some embodiments. Additionally, when ingress queues 228 are FIFO queues, the ingress arbitration circuitry 220 selects a data unit (or a portion of a data unit) from a head of a FIFO ingress queue 228, which corresponds to a data unit (or portion of a data unit) that has been in the FIFO ingress queue 228 for a longest time, in some embodiments.

Generally, when the ingress portion 204-*xa* is finished processing packets, the packets are transferred to one or more egress portions 204-*xb* via the interconnect 216. Transferring a data unit from an ingress portion 204-*xa* to an egress portions 204-*xb* comprises releasing (or dequeuing)

the data unit and transferring the data unit to the egress portion 204-*xb* via the interconnect 216, according to an embodiment.

The ingress arbitration circuitry 220 includes one or more wake up modules 236. Each wake up module 236 is configured to generate a control signal (not shown in FIG. 2) for turning on and turning off a clock network in another component of the ingress portion 204-*xa*, such as the ingress buffer memory 224 and/or the ingress packet processor 232. Turning off the clock network of a component of the ingress portion 204-*xa* significantly reduces power consumption in the component, and the clock network of the component can be turned off when the component is idle.

For example, the ingress arbitration circuitry 220 generally knows when the ingress buffer memory 224 is being accessed (e.g., written to, read from, etc.), and thus a wake up module 236 of the ingress arbitration circuitry 220 generates a control signal to turn off a clock network of the ingress buffer memory 224 when the ingress buffer memory 224 is not being accessed and turn on the clock network of the ingress buffer memory 224 when the ingress buffer memory 224 is being accessed. As another example, the ingress arbitration circuitry 220 generally knows when the ingress packet processor 232 is processing packet data, and thus a wake up module 236 of the ingress arbitration circuitry 220 generates a control signal to turn off a clock network of the ingress packet processor 232 when the ingress packet processor 232 is not processing packet data and turn on the clock network of the ingress packet processor 232 when the ingress packet processor 232 is processing packet data.

The egress portion 204-*xb* comprises circuitry 248 (sometimes referred to herein as "traffic manager circuitry 248") that is configured to control the flow of data units from the ingress portions 204-*xa* to one or more other components of the egress portion 204-*xb*. The egress portion 204-*xb* is coupled to an egress buffer memory 252 that is configured to store egress buffers. A buffer manager (not shown) within the traffic manager circuitry 248 temporarily stores data units received from one or more ingress portions 204-*xa* in egress buffers as they await processing by one or more other components of the egress portion 204-*xb*. The buffer manager of the traffic manager circuitry 248 is configured to operate in a manner similar to the buffer manager of the ingress arbitration circuitry 220 discussed above.

The egress buffer memory 252 (and buffers of the egress buffer memory 252) is structured the same as or similar to the ingress buffer memory 224 (and buffers of the ingress buffer memory 224) discussed above. For example, each data unit received by the egress portion 204-*xb* is stored in one or more entries within one or more buffers, which entries are marked as utilized to prevent newly received data units from overwriting data units that are already buffered in the egress buffer memory 252. After a data unit is released from the egress buffer memory 252, the one or more entries in which the data unit is buffered in the egress buffer memory 252 are then marked as available for storing newly received data units, in some embodiments.

Generally, buffers in the egress buffer memory 252 comprises a variety of buffers or sets of buffers, each utilized for varying purposes and/or components within the egress portion 204-*xb*.

The buffer manager (not shown) is configured to manage use of the egress buffers 252. The buffer manager performs, for example, one of or any suitable combination of the following: allocates and deallocates specific segments of memory for buffers, creates and deletes buffers within that memory, identifies available buffer entries in which to store a data unit, maintains a mapping of buffers entries to data units stored in those buffers entries (e.g., by a packet sequence number assigned to each packet when the first the first data unit in that packet was received), marks a buffer entry as available when a data unit stored in that buffer is dropped, sent, or released from the buffer, determines when a data unit is to be dropped because it cannot be stored in a buffer, performs garbage collection on buffer entries for data units (or portions thereof) that are no longer needed, etc., in various embodiments.

The traffic manager circuitry 248 is also configured to maintain egress queues 256, according to some embodiments, that are used to manage the order in which data units are processed from the egress buffers 252. The egress queues 256 are structured the same as or similar to the ingress queues 228 discussed above.

In an embodiment, different egress queues 256 may exist for different destinations. For example, each port 212 is associated with a respective set of one or more egress queues 256. The egress queue 256 to which a data unit is assigned may, for instance, be selected based on forwarding information indicating the target port determined for the packet should.

In some embodiments, different egress queues 256 correspond to respective flows or sets of flows. That is, packets for each identifiable traffic flow or group of traffic flows is assigned a respective set of egress queues 256. In some embodiments, different egress queues 256 correspond to different classes of traffic, QoS levels, etc.

In some embodiments, egress queues 256 correspond to respective egress ports 212 and/or respective priority sets. For example, a respective set of multiple queues 256 corresponds to each of at least some of the egress ports 212, with respective queues 256 in the set of multiple queues 256 corresponding to respective priority sets.

Generally, when the egress portion 204-*xb* receives packets from ingress portions 204-*xa* via the interconnect 116, the traffic manager circuitry 248 stores (or "enqueues") the packets in egress queues 256.

The ingress buffer memory 224 corresponds to a same or different physical memory as the egress buffer memory 252, in various embodiments. In some embodiments in which the ingress buffer memory 224 and the egress buffer memory 252 correspond to a same physical memory, ingress buffers 224 and egress buffers 252 are stored in different portions of the same physical memory, allocated to ingress and egress operations, respectively.

In some embodiments in which the ingress buffer memory 224 and the egress buffer memory 252 correspond to a same physical memory, ingress buffers 224 and egress buffers 252 include at least some of the same physical buffers, and are separated only from a logical perspective. In such an embodiment, metadata or internal markings may indicate whether a given individual buffer entry belongs to an ingress buffer 224 or egress buffer 252. To avoid contention when distinguished only in a logical sense, ingress buffers 224 and egress buffers 252 may be allotted a certain number of entries in each of the physical buffers that they share, and the number of entries allotted to a given logical buffer is said to be the size of that logical buffer. In some such embodiments, when a packet is transferred from the ingress portion 204-*xa* to the egress portion 204-*xb* within a same packet processing module 204, instead of copying the packet from an ingress buffer entry to an egress buffer, the data unit remains in the same buffer entry, and the designation of the buffer entry (e.g., as belonging to an ingress queue versus an egress queue) changes with the stage of processing.

The egress portion 204-*xb* also includes an egress packet processor 268 that is configured to perform egress processing operations for packets such as one of, or any suitable combination of two or more of: packet duplication (e.g., for multicast packets), header alteration, rate limiting, traffic shaping, egress policing, flow control, maintaining statistics regarding packets, etc., according to various embodiments. As an example, when a header of a packet is to be modified (e.g., to change a destination address, add a tunneling header, remove a tunneling header, etc.) the egress packet processor 268 modifies header information in the egress buffers 252, in some embodiments.

In an embodiment, the egress packet processor 268 is coupled to a group of egress ports 212 via egress arbitration circuitry 272 that is configured to regulate access to the group of egress ports 212 by the egress packet processor 268.

In some embodiments, the egress packet processor 268 is additionally or alternatively coupled to suitable destinations for packets other than egress ports 212, such as one or more internal central processing units (not shown), one or more storage subsystems, etc.

In the course of processing a data unit, the egress packet processor 268 may replicate a data unit one or more times. For example, a data unit may be replicated for purposes such as multicasting, mirroring, debugging, and so forth. Thus, a single data unit may be replicated, and stored in multiple egress queues 256. Hence, though certain techniques described herein may refer to the original data unit that was received by the network device 200, it will be understood that those techniques will equally apply to copies of the data unit that have been generated by the network device for various purposes. A copy of a data unit may be partial or complete. Moreover, there may be an actual physical copy of the data unit in egress buffers 252, or a single copy of the data unit 252 may be linked from a single buffer location (or single set of locations) in the egress buffers 252 to multiple egress queues 256.

The traffic manager circuitry 248 includes one or more wake up modules 280. Each wake up module 280 is configured to generate a control signal (not shown in FIG. 2) for turning on and turning off a clock network in another component of the egress portion 204-*xb*, such as the egress buffer memory 252, the egress packet processor 268, and/or the egress arbitration circuitry 272. Turning off the clock network of a component of the egress portion 204-*xb* significantly reduces power consumption in the component, and the clock network of the component can be turned off when the component is idle.

For example, the traffic manager circuitry 248 generally knows when the egress buffer memory 252 is being accessed (e.g., written to, read from, etc.), and thus a wake up module 280 of the traffic manager circuitry 248 generates a control signal to turn off a clock network of the egress buffer memory 252 when the egress buffer memory 252 is not being accessed and turn on the clock network of the egress buffer memory 252 when the egress buffer memory 252 is being accessed. As another example, the traffic manager circuitry 248 generally knows when the egress packet processor 268 is processing packet data, and thus a wake up module 280 of the traffic manager circuitry 248 generates a control signal to turn off a clock network of the egress packet processor 268 when the egress packet processor 268 is not processing packet data and turn on the clock network of the egress packet processor 268 when the egress packet processor 268 is processing packet data. As another example, the traffic manager circuitry 248 generally knows when the egress arbitration circuitry 272 is processing packet data, and thus a wake up module 280 of the traffic manager circuitry 248 generates a control signal to turn off a clock network of the egress arbitration circuitry 272 when the egress arbitration circuitry 272 is not processing packet data and turn on the clock network of the egress arbitration circuitry 272 when the egress arbitration circuitry 272 is processing packet data.

Figure 3:
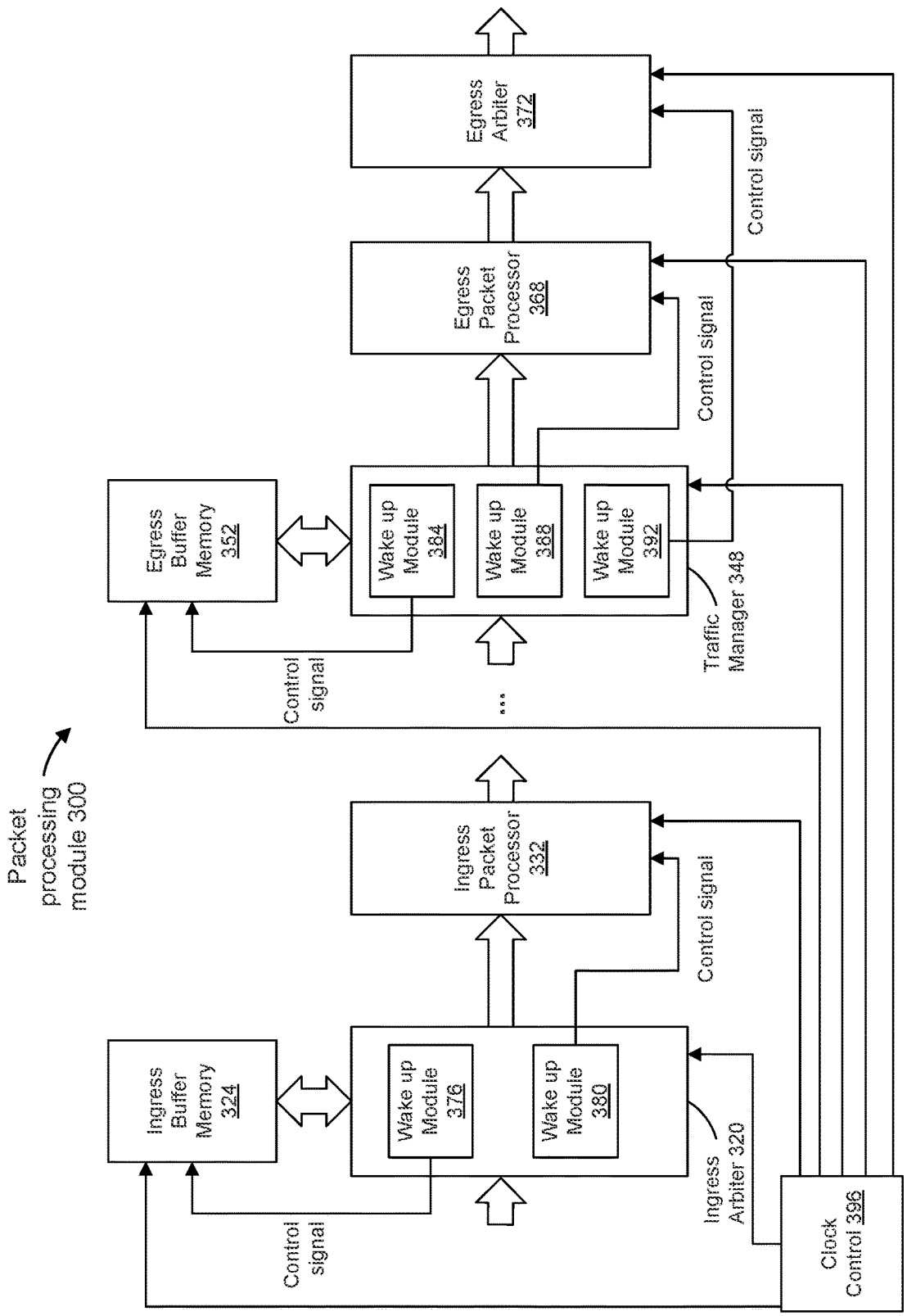
FIG. 3 is a simplified block diagram of an example packet processing module of the network device of FIG. 2, according to an embodiment.

FIG. 3 is a simplified block diagram of an example packet processing module 300, according to an embodiment. Each of at least some of the packet processing modules 204 of FIG. 2 has a format that corresponds to the packet processing module 300 of FIG. 3, in an embodiment. For example, the ingress arbitration circuitry 220 of FIG. 2 corresponds to ingress arbitration circuitry 320 of FIG. 3; the ingress buffer memory 224 of FIG. 2 corresponds to an ingress buffer memory 324 of FIG. 3; the ingress packet processor 232 of FIG. 2 corresponds to an ingress packet processor 332 of FIG. 3; the traffic manager circuitry 248 of FIG. 2 corresponds to traffic manager circuitry 348 of FIG. 3; the egress buffer memory 252 of FIG. 2 corresponds to an egress buffer memory 352 of FIG. 3; the egress packet processor 268 of FIG. 2 corresponds to an egress packet processor 368 of FIG. 3; and the egress arbiter 272 of FIG. 2 corresponds to an egress arbiter 372 of FIG. 3.

For ease of explanation, FIG. 3 does not depict ingress ports, egress ports, or an interconnect such as the ingress ports 208, the egress ports 212, and the interconnect 216 of FIG. 2.

The ingress arbitration circuitry 320 includes a wake up module 376 and a wake up module 380 that correspond to the one or more wake up modules 236 of FIG. 2.

The wake up module 376 is configured to generate a control signal for turning on and turning off a clock network in the ingress buffer memory 324. For example, the ingress arbitration circuitry 320 informs the wake up module 376 when the ingress buffer memory 324 is being accessed (e.g., written to, read from, etc.), and the wake up module 376 generates the control signal to turn off the clock network of the ingress buffer memory 324 when the ingress buffer memory 324 is not being accessed and turn on the clock network of the ingress buffer memory 324 when the ingress buffer memory 324 is being accessed.

The wake up module 380 is configured to generate a control signal for turning on and turning off a clock network in the ingress packet processor 332. For example, the ingress arbitration circuitry 320 informs the wake up module 380 when the ingress packet processor 332 is processing packet data, and the wake up module 380 generates a control signal to turn off the clock network of the ingress packet processor 332 when the ingress packet processor 332 is not processing packet data and turn on the clock network of the ingress packet processor 332 when the ingress packet processor 332 is processing packet data.

The traffic manager circuitry 348 includes a wake up module 384, a wake up module 388, and a wake up module 392 that correspond to the one or more wake up modules 280 of FIG. 2.

The wake up module 384 is configured to generate a control signal for turning on and turning off a clock network in the egress buffer memory 352. For example, the traffic manager circuitry 348 informs the wake up module 384 when the egress buffer memory 352 is being accessed (e.g., written to, read from, etc.), and the wake up module 384 generates the control signal to turn off the clock network of the egress buffer memory 352 when the egress buffer memory 352 is not being accessed and turn on the clock network of the egress buffer memory 352 when the egress buffer memory 352 is being accessed.

The wake up module 388 is configured to generate a control signal for turning on and off a clock network in the egress packet processor 368. For example, the traffic manager circuitry 348 informs the wake up module 388 when the egress packet processor 368 is processing packet data, and the wake up module 388 generates a control signal to turn off the clock network of the egress packet processor 368 when the egress packet processor 368 is not processing packet data and turn on the clock network of the egress packet processor 368 when the egress packet processor 368 is processing packet data.

The wake up module 392 is configured to generate a control signal for turning on and off a clock network in the egress arbitration circuitry 372. For example, the traffic manager circuitry 348 informs the wake up module 392 when the egress arbitration circuitry 372 is processing packet data, and the wake up module 392 generates a control signal to turn off the clock network of the egress arbitration circuitry 372 when the egress arbitration circuitry 372 is not processing packet data and turn on the clock network of the egress arbitration circuitry 372 when the egress arbitration circuitry 372 is processing packet data.

The packet processing module 300 also includes clock control circuitry 396 that is configured to generate additional control signals for turning on and turning off respective clock networks in the ingress arbitration circuitry 320, the ingress buffer memory 324, the ingress packet processor 332, the traffic manager circuitry 348, the egress buffer memory 352, the egress packet processor 368, and the egress arbiter 372. For example, when the packet processing module 300 is disabled, to be put into a global low power mode, etc., the clock control circuitry 396 is configured to generate the additional control signals to turn off the respective clock networks.

In some embodiments, the clock control circuitry 396 is omitted.

Figure 4A:
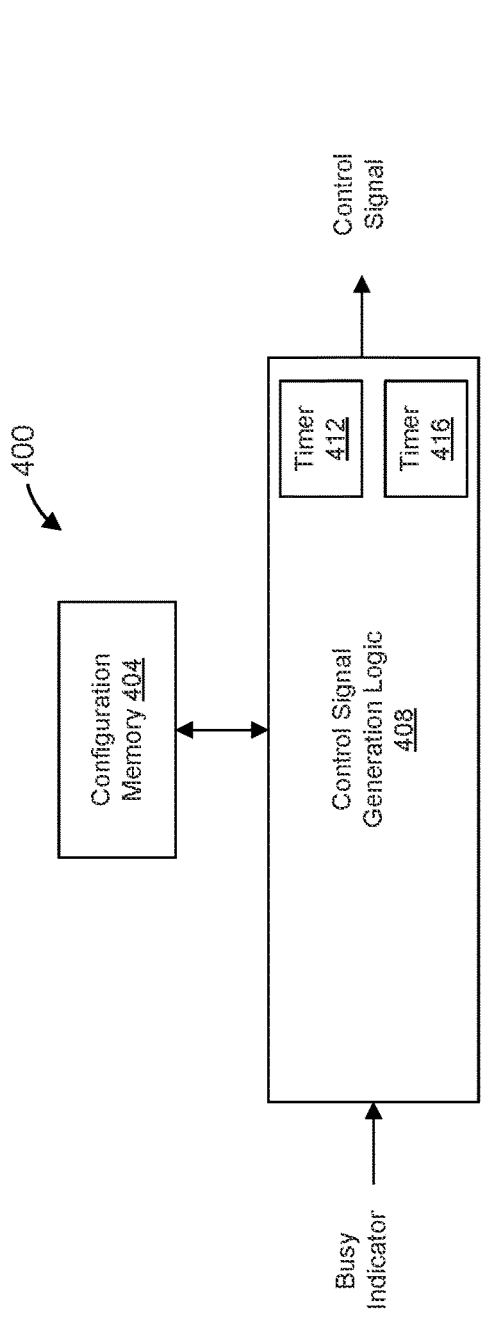
FIG. 4A is a simplified block diagram of an example wake up module used in the network device of FIG. 2 and/or the packet processing module of FIG. 3, according to an embodiment.

FIG. 4A is a simplified block diagram of an example wake up module 400, according to an embodiment. The wake up module 400 is used as one or more of the wake up modules 236 (FIG. 2), one or more of the wake up modules 280 (FIG. 2), and/or one or more of the wake up modules 376, 380, 384, 388, 392 (FIG. 3), in various embodiments. In some embodiments, one or more of the wake up modules 236 (FIG. 2), one or more of the wake up modules 280 (FIG. 2), and/or one or more of the wake up modules 376, 380, 384, 388, 392 (FIG. 3) have a suitable structure different than the wake up module 400. In some embodiments, the wake up module 400 is used in a suitable network device different than the network device 200 of FIG. 2, and/or in a suitable packet processing module different than the packet processing module 300 of FIG. 2.

The wake up module 400 includes a configuration memory 404 coupled to control signal generation logic 408. The control signal generation logic 408 is configured to generate a control signal based on i) a busy indicator signal received by the wake up module 400, and ii) configuration information stored in the configuration memory 404.

In some embodiments, the control signal generation logic 408 is configured to generate the control signal based on the busy indicator signal so that the control signal selectively indicates, according to configuration information in the configuration memory 404, that the clock network should remain on for a minimum amount of time. In some embodiments, when the control signal is to be generated to indicate that the clock network should remain on for the minimum amount of time, the control signal generation logic 408 is configured to generate the control signal so that the control signal indicates, according to configuration information in the configuration memory 404, the amount of time that the clock network should remain on. In some embodiments, the control signal generation logic 408 is additionally or alternatively configured to generate the control signal based on the busy indicator signal so that the control signal selectively indicates, according to configuration information in the configuration memory 404, that the clock network should turn on after a delay from a time at which the busy indicator signal indicates a component of a network device is being accessed. In some embodiments, when the control signal is to be generated to indicate that the clock network should turn on after the delay, configuration information in the configuration memory 404 indicates a duration of the delay; and the control signal generation logic 408 uses the configuration information that indicates the duration of the delay to generate the control signal.

Figure 4B:
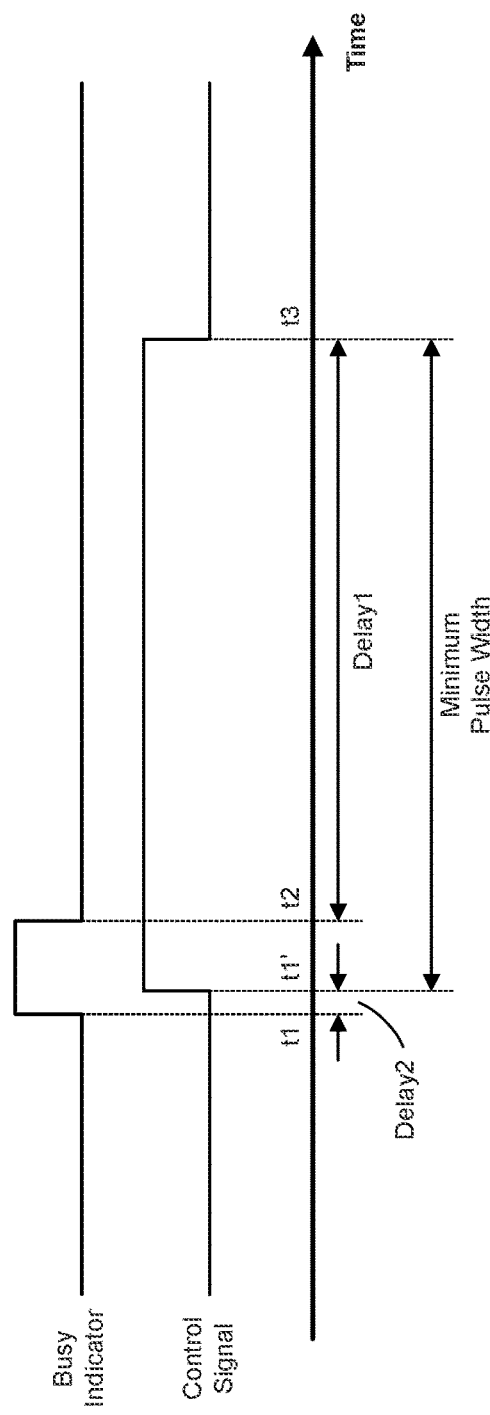
FIG. 4B is diagram of an example busy indicator signal received by the wake up module of FIG. 4A and an example control signal generated by the wake up module of FIG. 4A based on the busy indicator signal, according to an embodiment.

FIG. 4B is a diagram of an example busy indicator signal received by the wake up module 400 and an example control signal generated by the control signal generation logic 408 based on the busy indicator signal, according to an embodiment. In particular, the example control signal of 4B corresponds to a scenario in which configuration information in the configuration memory 404 indicates the control signal is to be generated to indicate that i) the clock network should remain on for the minimum amount of time, and ii) that the clock network should turn on after a delay from a time at which the busy indicator signal indicates a component of a network device is being accessed.

In the example of FIG. 4B, the busy indicator signal is a pulse that indicates a component of a network device is being accessed. Because the component is being accessed the component is not idle and thus a clock network of the component should be on. In some embodiments, the busy indicator signal corresponds to a memory access command (e.g., a read command, a write command, etc.) being sent to a memory of the network device, such as the ingress buffer memory 224 (FIG. 2), the egress buffer memory 252 (FIG. 2), the ingress buffer memory 324 (FIG. 3), the egress buffer memory 352 (FIG. 3), etc. In other embodiments, the busy indicator signal corresponds to another suitable command (e.g., a command to begin processing data) being sent to a suitable component other than a memory (e.g., a component configured to process packet data such as a packet processor).

At time t1, the busy indicator signal transitions from a logic LOW level to a logic HIGH level, which indicates the component of the network device is being accessed. For example, the busy indicator signal transitioning from LOW to HIGH indicates that a memory access command is being provided to a memory of the network device, in an embodiment. As another example, the busy indicator signal transitioning from LOW to HIGH indicates that a command is being provided to a component of the network device to indicate that the component is to begin processing packet data, in another embodiment.

In response to the busy indicator signal transitioning from LOW to HIGH, the control signal generation logic 408 causes the control signal to transition from LOW to HIGH. Additionally, configuration information in the configuration memory 404 indicates that the control signal should remain HIGH for a time period that is longer than a width of the pulse of the busy indicator signal. For example, configuration information in the configuration memory 404 indicates the control signal should remain HIGH for a minimum pulse width, in an embodiment. In an embodiment, the configuration information in the configuration memory 404 indicates a duration of the minimum pulse width. As another example, configuration information in the configuration memory 404 indicates the control signal should remain HIGH after the busy indicator signal transitions from HIGH to LOW for a delay period ("Delay1" in FIG. 4B), in an embodiment. In an embodiment, the configuration information in the configuration memory 404 indicates a duration of Delay1.

Referring now to FIGS. 4A and 4B, the configuration generation logic 408 includes a first timer 412 that is configured to measure the time period that is longer than the width of the busy indicator signal, and the configuration generation logic 408 uses the first timer 412 to keep the control signal HIGH for the time period that is longer than the width of the busy indicator signal. In an embodiment, the first timer 412 measures a time period indicated by configuration information in the configuration memory 404. For example, the first timer 412 measures a minimum pulse width of the control signal as indicated by configuration information in the configuration memory 404. As another example, the first timer 412 measures the duration of Delay1 as indicated by configuration information in the configuration memory 404.

In some embodiments, the configuration information in the configuration memory 404 that indicates the duration of the minimum pulse width is set to a predetermined value (e.g., zero or another suitable predetermined value) to indicate that the control signal generation logic 408 is not to generate the control signal so that the control signal remains HIGH for a time period that is longer than the width of the pulse of the busy indicator signal, e.g., that the control signal should transition from HIGH to LOW when the busy indicator signal transitions from HIGH to LOW at time t2.

In some embodiments, the control signal generation logic 408 is additionally or alternatively configured to selectively generate the control signal so that the control signal transitions from LOW to HIGH after a delay from when the busy indicator signal transitions from LOW to HIGH. For example, there may be a delay from when the busy indicator signal transitions from LOW to HIGH until the clock network of the component needs to be turned on.

In an embodiment, configuration information in the configuration memory 404 indicates whether the control signal generation logic 408 is to generate the control signal so that the control signal transitions from LOW to HIGH after the delay from when the busy indicator signal transitions from LOW to HIGH. In an embodiment, configuration information in the configuration memory 404 additionally indicates a duration of the delay ("Delay2" in FIG. 4B).

The configuration generation logic 408 includes a second timer 416 that is configured to measure Delay2, and the configuration generation logic 408 uses the second timer 416 to keep the control signal LOW until the second timer 416 expires. In an embodiment, the second timer 416 measures Delay2 as indicated by configuration information in the configuration memory 404.

In some embodiments, the configuration information in the configuration memory 404 that indicates the duration of the delay (e.g., Delay2) is set to a predetermined value (e.g., zero or another suitable predetermined value) to indicate that the control signal generation logic 408 is not to generate the control signal so that the control signal transitions from LOW to HIGH after a delay from when the busy indicator signal transitions from LOW to HIGH, e.g., that the control signal should transition from LOW to HIGH when the busy indicator signal transitions from LOW to HIGH at time t1.

In some embodiments in which the control signal generation logic 408 is not required to generate the control signal so that the control signal transitions from LOW to HIGH after a delay from when the busy indicator signal transitions from LOW to HIGH, the second timer 416 is optionally omitted.

In embodiments in which the minimum pulse width is different for different commands (e.g., a read command, a write command, a command to begin processing data, etc.), a respective wake up module 400 is used for each of the different commands, and the multiple control signals generated by the multiple wake up modules 400 are combined into a single combined control signal, as will be described below. In other embodiments, the configuration memory 404 stores configuration information that indicates the different minimum pulse widths for the different commands; the control signal generation logic 408 also receives an indicator of a type of command corresponding to the busy indicator signal; and the control signal generation logic 408 is configured to use the indicator of the type of command to retrieve minimum pulse width information corresponding to the type of the command from the configuration memory 404, and to use the minimum pulse width information corresponding to the type of the command to generate the control signal.

Figure 4C:
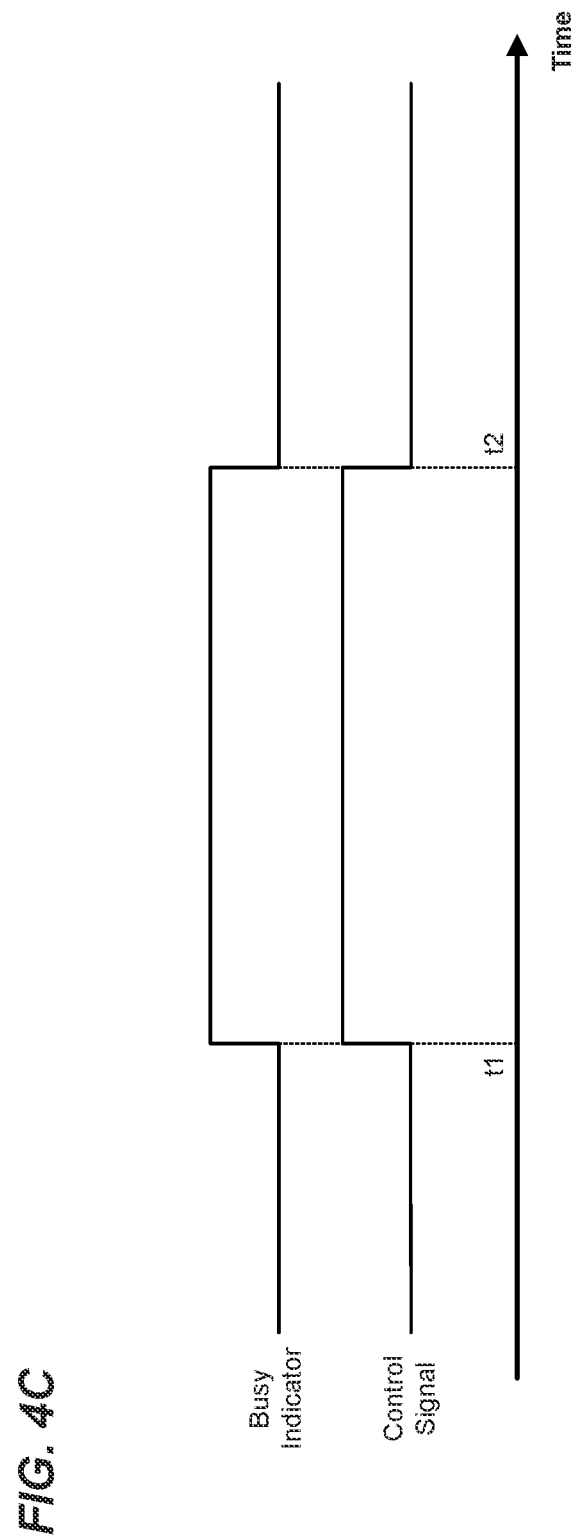
FIG. 4C is diagram of another example busy indicator signal received by the wake up module of FIG. 4A and another example control signal generated by the wake up module of FIG. 4A based on the busy indicator signal, according to an embodiment.

FIG. 4C is a diagram of another example busy indicator signal received by the wake up module 400 and another example control signal generated by the control signal generation logic 408 based on the busy indicator signal, according to an embodiment. In particular, the example control signal of 4C corresponds to a scenario in which i) configuration information in the configuration memory 404 indicates that the control signal is not to be generated to indicate the clock network should remain on for the minimum amount of time, and ii) either a) the control signal generation logic 408 is not capable of generating the control signal to indicate that the clock network should turn on after a delay from a time at which the busy indicator signal indicates a component of a network device is being accessed, or b) configuration information in the configuration memory 404 indicates the control signal is not to be generated to indicate that the clock network should turn on after a delay from a time at which the busy indicator signal indicates a component of a network device is being accessed.

In the examples of FIGS. 4B and 4C, a LOW value of the busy indicator signal generally indicates the clock network of the component can be turned OFF and a HIGH value of the busy indicator signal generally indicates the clock network of the component should be turned ON. In other embodiments, the logic levels of the busy indicator signal are reversed so that a HIGH value of the busy indicator signal generally indicates the clock network of the component can be turned OFF and a LOW value of the busy indicator signal generally indicates the clock network of the component should be turned ON. Similarly, in the examples of FIGS. 4B and 4C, a LOW value of the control signal generally indicates the clock network of the component should be OFF and a HIGH value of the control signal generally indicates the clock network of the component should be ON. In other embodiments, the logic levels of the busy indicator signal are reversed so that a HIGH value of the control signal generally indicates the clock network of the component should be OFF and a LOW value of the control signal generally indicates the clock network of the component should be ON.

In various embodiments, the control signal generation logic 408 comprises suitable circuitry configured to perform the acts discussed above, such as hardware circuitry, a hardware state machine, a processor configured to execute machine-readable instructions stored in a memory, etc. In various embodiments, the configuration memory 404 includes one or more suitable memory devices such as one or more registers, a random access memory (RAM), a read only memory (ROM), a solid state memory such as a Flash memory, etc.

Figure 5:
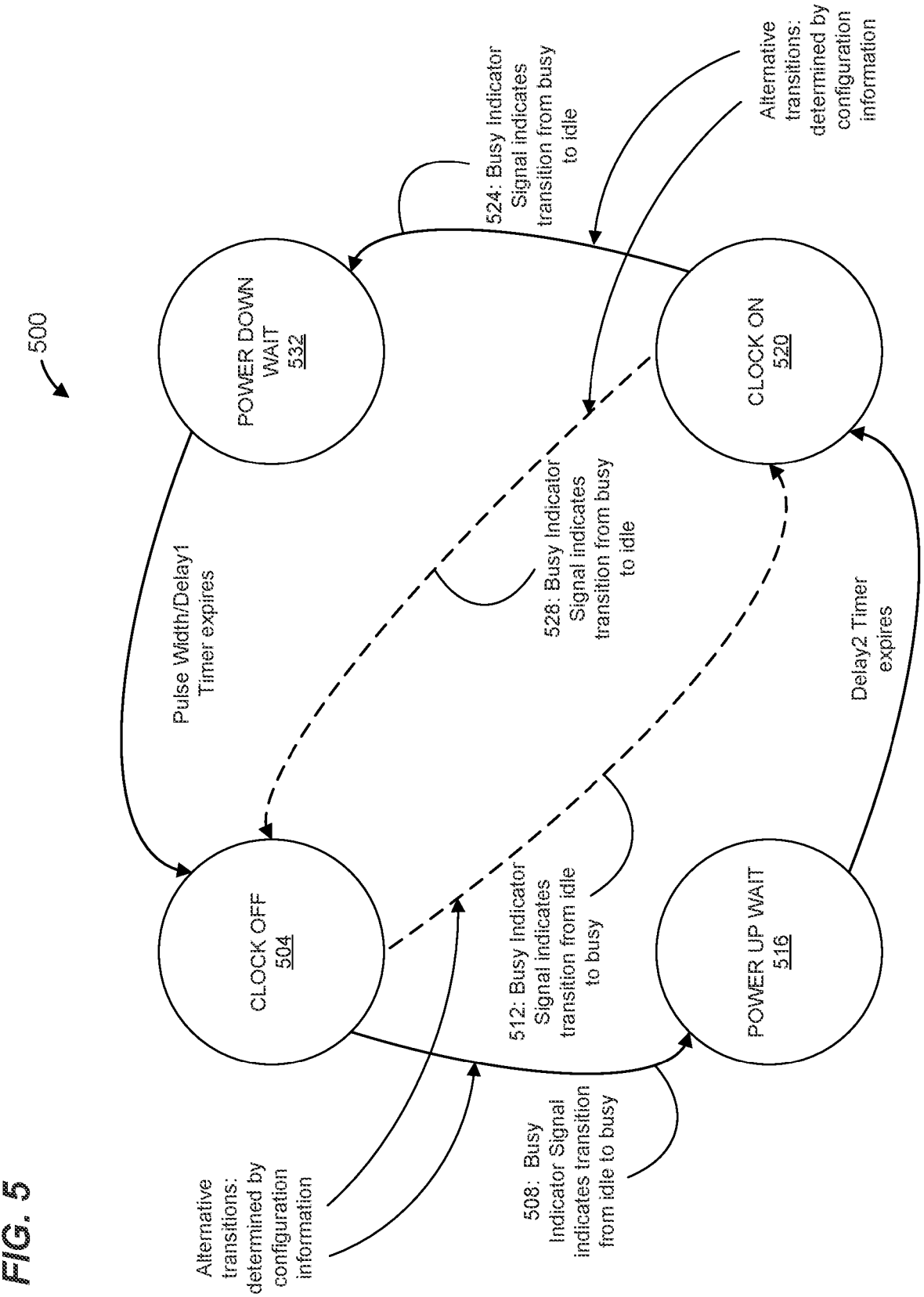
FIG. 5 is a simplified state transition diagram corresponding to an example operation of the wake up module of FIG. 4A, according to an embodiment.

FIG. 5 is a simplified state transition diagram 500 corresponding to an example operation of the control signal generation logic 408 of FIG. 4A, according to an embodiment, and FIG. 5 is described with reference to FIG. 4A for ease of explanation. In other embodiments, the control signal generation logic 408 operates according to another suitable state transition mechanism different than the state transition diagram 500. In other embodiments, the state transition diagram 500 is implemented by another suitable wake up module different than the wake up module 400 of FIG. 4A.

A state 504 corresponds to the component being idle and therefore the clock network of the component can be off. In the state 504, the control signal generation logic 408 generates the control signal to indicate the clock network of the component is to be off. While the busy indicator signal indicates that the clock network of the component is to remain off, the control signal generation logic 408 remains in the state 504. In response to the busy indicator signal indicating that the clock network of the component is to turn on, the control signal generation logic 408 takes one of two alternate state transitions depending on configuration information in the configuration memory 404: 508 and 512.

When the configuration information indicates that transition 508 is to be taken, the control signal generation logic 408 transitions to a state 516. Upon transitioning to the state 516, the control signal generation logic 408 starts the second timer 416. While in the state 516, the control signal generation logic 408 generates the control signal to indicate the clock network of the component is to be off.

In response to the second timer 416 expiring, the control signal generation logic 408 transitions to a state 520. The state 520 corresponds to the component being busy and therefore the clock network of the component should be ON. Upon transitioning to the state 520, the control signal generation logic 408 transitions the control signal to indicate the clock network of the component should be on. While in the state 520, the control signal generation logic 408 generates the control signal to indicate the clock network of the component should be on.

Referring again to the state 504, when the configuration information indicates that transition 512 is to be taken, the control signal generation logic 408 transitions to the state 520 without first transitioning to the state 516. Upon transitioning to the state 520, the control signal generation logic 408 transitions the control signal to indicate the clock network of the component should be on.

In some embodiments in which the control signal generation logic 408 is not capable of generating the control signal so that the control signal transitions from LOW to HIGH after a delay from when the busy indicator signal transitions from LOW to HIGH, the state 516 and the transition 508 are omitted.

While the busy indicator signal indicates that the clock network of the component is to be on, the control signal generation logic 408 remains in the state 520. In response to the busy indicator signal indicating that the clock network of the component is to turn off, the control signal generation logic 408 takes one of two alternate state transitions depending on configuration information in the configuration memory 404: 524 and 528.

When the configuration information indicates that transition 524 is to be taken, the control signal generation logic 408 transitions to a state 532. Upon transitioning to the state 532, the control signal generation logic 408 starts the first timer 412. While in the state 532, the control signal generation logic 408 generates the control signal to indicate the clock network of the component is to be on.

In response to the first timer 412 expiring, the control signal generation logic 408 transitions to the state 504. Upon transitioning to the state 504, the control signal generation logic 408 transitions the control signal to indicate the clock network of the component should be off. As discussed above, while in the state 504, the control signal generation logic 408 generates the control signal to indicate the clock network of the component should be off.

Referring again to the state 520, when the configuration information indicates that transition 512 is to be taken, the control signal generation logic 408 transitions to the state 504 without first transitioning to the state 532. Upon transitioning to the state 504, the control signal generation logic 408 transitions the control signal to indicate the clock network of the component should be off.

Figure 6:
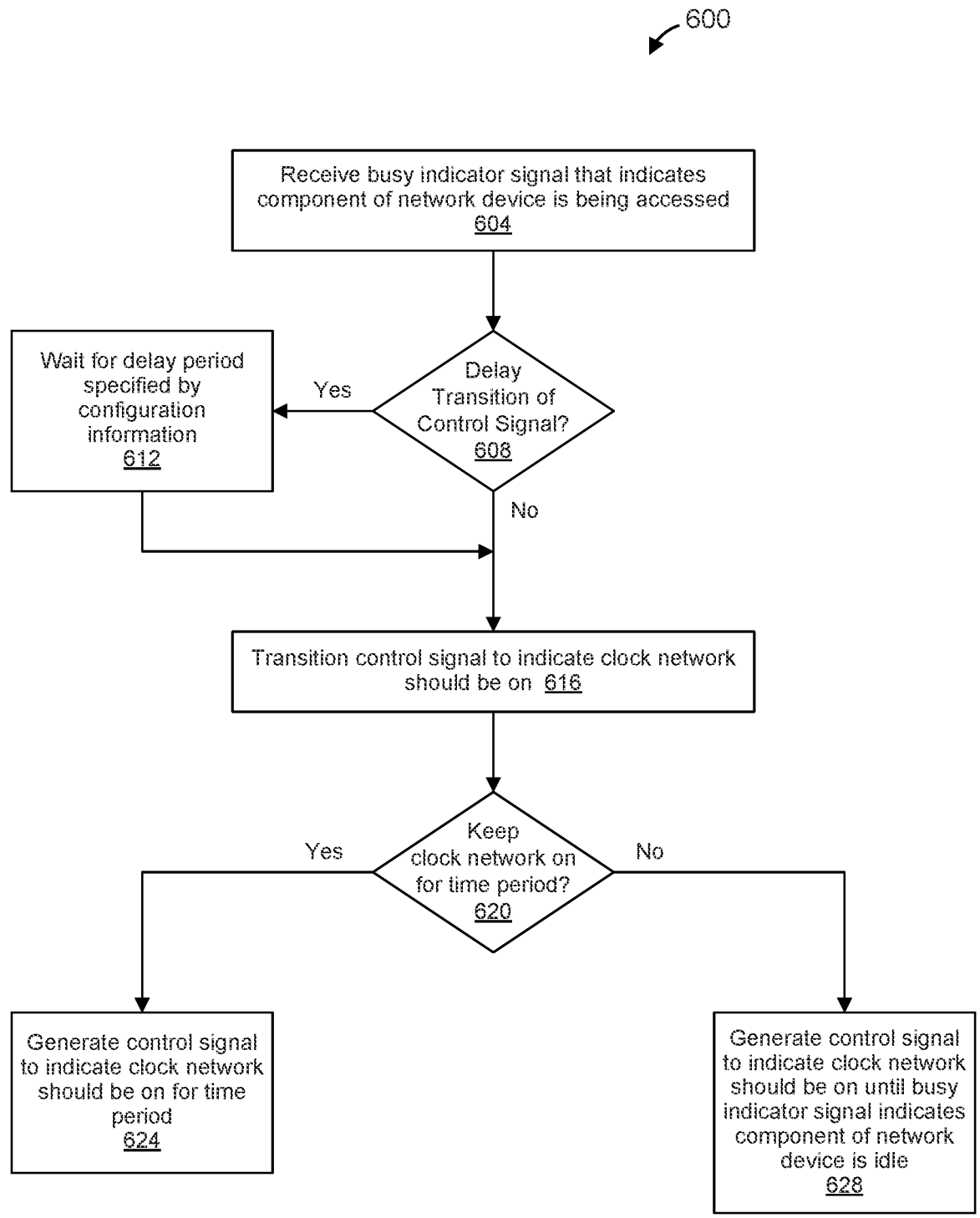
FIG. 6 is a flow diagram of an example method for power saving in a network device, according to an embodiment.

FIG. 6 is a flow diagram of an example method 600 for power saving in a network device, according to an embodiment. The method 600 is implemented by the wake up module 400 of FIG. 4A, according to an embodiment, and the method 600 is described with reference to FIGS. 4A-C for ease of explanation. In other embodiments, the method 600 is implemented by another suitable wake up module different than the wake up module 400. In an embodiment, the method 600 is implemented by a state machine described with reference to FIG. 5. In other embodiments, the method 600 is implemented according to another suitable state machine.

The method 600 is implemented by the network device 200 of FIG. 2, according to an embodiment. In other embodiments, the method 600 is implemented by another suitable network device different than the network device 200.

At block 604, circuitry receives a signal that indicates a component of the network device is being accessed. For example, the wake up module 400 receives the busy indicator signal that indicates a component of the network device is being accessed. Because the component of the network device is being accessed, a clock network of the component should be activated (e.g., turned on).

The circuitry is configured to generate a control signal based on the busy indicator signal. For example, the control signal generation logic 408 is configured to generate the control signal based on the busy indicator signal.

At block 608, the circuitry determines whether transition of the control signal to indicate the clock network should be turned on should be delayed based on configuration information stored in a memory associated with the circuitry. Delay of the transition of the control signal is with respect to a transition in the busy indicator signal that indicates the component of the network device is being accessed, in an embodiment. For example, the control signal generation logic 408 uses configuration information in the configuration memory 404 to determine whether transition of the control signal to indicate the clock network should be turned on should be delayed with respect to a transition in the busy indicator signal that indicates the component of the network device is being accessed.

When the circuitry determines at block 608 that the transition of the control signal should be delayed, the flow proceeds to block 612. At block 612, the circuitry waits for a time period specified by configuration information stored in the memory associated with the circuitry. For example, the control signal generation logic 408 waits to transition of the control signal for a time period (Delay2) specified by configuration information in the configuration memory 404.

In an embodiment, the circuitry includes a first timer that is configured to measure the time period specified by the configuration information in the memory associated with the circuitry, and block 612 includes using the first timer to measure the time period specified by configuration information in the memory.

After waiting the time period at block 612, the flow proceeds to block 616. At block 616, the circuitry generates the control signal to transition to indicate that the clock network of the component should be on. For example, the control signal generation logic 408 generates the control signal so that the transition of the control signal to indicate that the clock network of the component should be on.

Referring again to block 608, when the circuitry determines at block 608 that the transition of the control signal should not be delayed, the flow proceeds to block 616.

At block 620, the circuitry determines, based on configuration information stored in the memory, whether the control signal should be generated to keep the clock network on for a particular time period. For example, the control signal generation logic 408 uses configuration information in the configuration memory 404 to determine whether the control signal should be generated to keep the clock network on for the particular time period.

When the circuitry determines at block 620 that the control signal should be generated to keep the clock network on for the particular time period, the flow proceeds to block 624. At block 624, the circuitry generates the control signal to keep the clock network on for the particular time period. For example, the control signal generation logic 408 waits to transition the control signal for a time period specified by configuration information in the configuration memory 404. In an embodiment, the time period corresponding to block 624 is measured with reference to the transition of the control signal corresponding to block 616, e.g., t3–t1' of FIG. 4B. In another embodiment, the time period is measured with reference to a transition of the busy indication signal, e.g., Delay1 of FIG. 4B.

In an embodiment, the circuitry includes a second timer that is configured to measure the time period specified by the configuration information in the memory associated with the circuitry, and block 624 includes using the second timer to measure the time period specified by configuration information in the memory.

In an embodiment, the component is a memory; the busy indicator signal is a signal indicating a memory access command is being provided to the component; and the method 600 further comprises: the circuitry further receiving a signal that indicates a type of the memory access command (e.g., Read, Write, etc.), and the circuitry using the signal that indicates the type of the memory access command to select, from the memory associated with the circuitry, a time period (for use at block 624) from among different time periods corresponding to different types of memory access commands. In some such embodiments, respective indications of the different time periods are stored in the memory associated with the circuitry and the c.

Referring again to block 620, when the circuitry determines at block 620 that the control signal should not be generated to keep the clock network on for the particular time period, the flow proceeds to block 628. At block 628, the circuitry generates the control signal to indicate the clock network should be on until the busy indicator signal indicates the component is idle. For example, the control signal generation logic 408 transitions the control signal to deactivate (e.g., turn off) the clock network of the component when the busy indicator signal transitions to indicate the component is idle, such as illustrated in the example of FIG. 4C.

In some embodiments, blocks 608 and 612 are omitted and the method 600 flows from block 604 to block 616.

Figure 7:
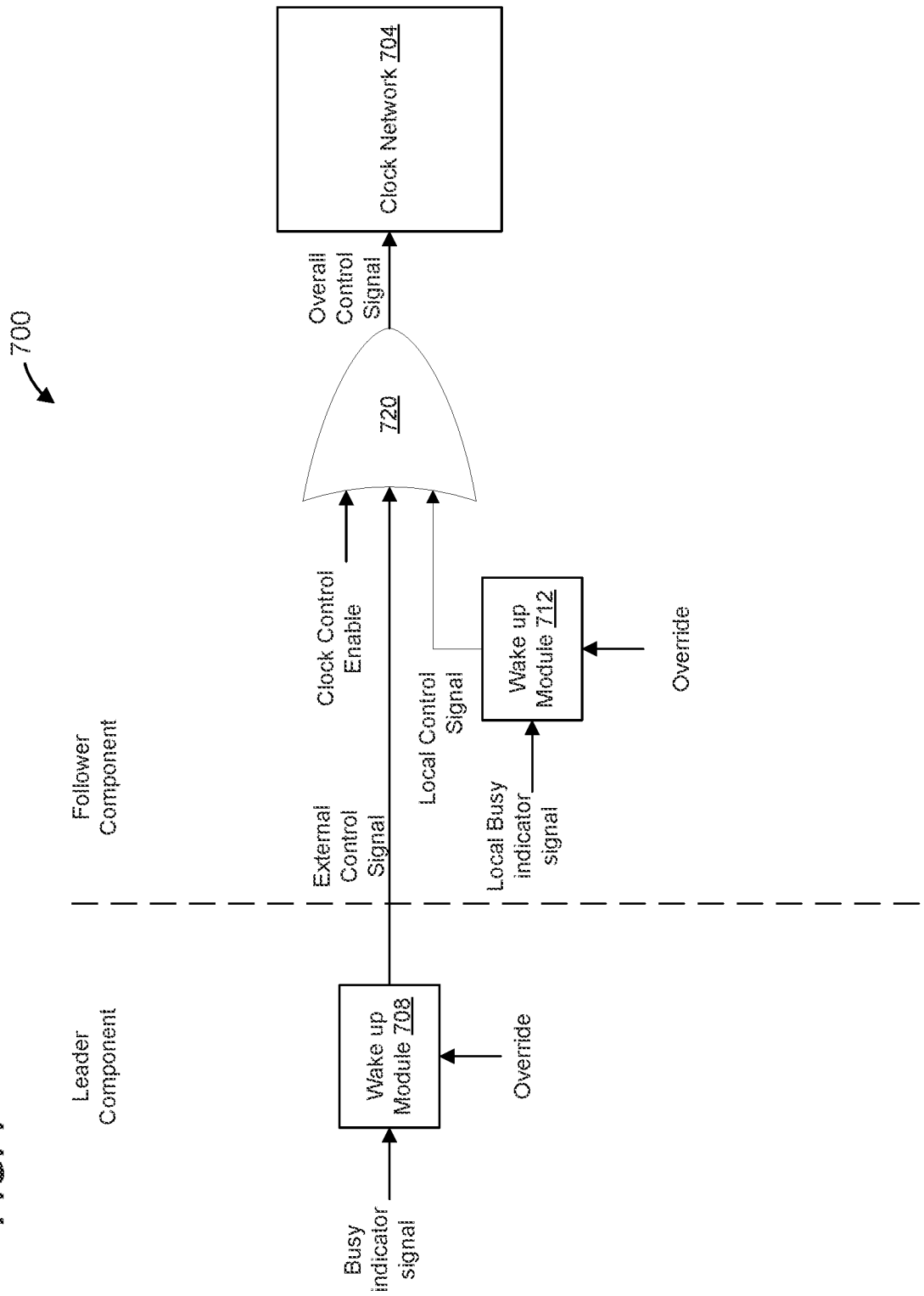
FIG. 7 is a simplified block diagram illustrating an example use of wake up modules in components of a network device, according to an embodiment.

FIG. 7 is a simplified block diagram 700 illustrating an example use of wake up modules in components of a network device, according to an embodiment. The network device is a switch, a router, etc., according to various embodiments. The network device is the network device 200 of FIG. 2, in an embodiment. The network device is another suitable network device different than the network device 200 of FIG. 2, in an embodiment.

In an embodiment, the leader component is a component of a network device that generally provides packet data to the follower component and/or otherwise accesses the follower component.

In FIG. 7, a dashed vertical line indicates a division between a first component ("leader component") of the network device and a second component ("follower component") of the network device. In an embodiment, the follower component is a memory, and the leader component writes packet data to the memory and reads packet data from the memory. For example, the follower component is the ingress buffer memory 224 or the egress buffer memory 252, and the leader component is the ingress arbiter circuitry 220 or the traffic manager circuitry 248, respectively, according to some embodiments.

In another embodiment, the follower component is a packet processor, and the leader component provides packet data to the packet processor for processing by the packet processor. For example, the follower component is the ingress packet processor 232 or the egress packet processor 268, and the leader component is the ingress arbiter circuitry 220 or the traffic manager circuitry 248, respectively, according to some embodiments.

The follower component includes a clock network 704, and the leader component includes a wake up module 708 that is configured to generate, based on a busy indicator signal generated by the leader component, an external control signal for selectively activating and deactivating the clock network 704. The busy indicator signal generated by the leader component indicates when the follower component is busy. For example, in embodiments in which the follower component is a memory, the busy indicator signal indicates when the leader component sends a memory access command to the memory. As another example, in embodiments in which the follower component is a packet processor, the busy indicator signal indicates when the leader component sends packet data to the packet processor for processing by the packet processor and, optionally, when the follower component has finished processing the packet data provided by the packet processor.

In various embodiments, the wake up module 708 includes any of the example wake up modules described above and/or operates according to any of the example techniques described above. In other embodiments, the wake up module 708 includes a suitable wake up module different than the example wake up modules described above and/or operates according to a suitable technique different than the example techniques described above.

The follower component also includes a wake up module 712 that is configured to generate, based on a local busy indicator signal generated by the follower component, a local control signal for selectively activating and deactivating the clock network 704. The local busy indicator signal generated by the follower component indicates when the follower component is busy because of tasks initiated by the follower component (such as background processing tasks) and not initiated by the leader component.

Logic circuitry 720, such as an OR gate or other suitable logic circuitry, generates an overall control signal based on the external control signal from the leader component and the local control signal generated by the follower component. For example, the logic circuitry 720 is configured to generate the overall control signal to turn on the clock network 704 when either or both of the external control signal and the local control signal indicate that the clock network 704 should be on.

In an embodiment, the logic circuitry 720 is additionally configured to receive a clock control enable signal and to generates the overall control signal further based on the control enable signal. For example, the clock control enable signal indicates when the overall control signal should turn the clock network 704 on irrespective of the external control signal and the local control signal, and the logic circuitry 720 generates the overall control signal to turn the clock network 704 on irrespective of the external control signal and the local control signal when indicated by the clock control enable signal, according to an embodiment. As another example, the clock control enable signal indicates when the overall control signal should turn the clock network 704 off irrespective of the external control signal and the local control signal, and the logic circuitry 720 generates the overall control signal to turn the clock network 704 off irrespective of the external control signal and the local control signal when indicated by the clock control enable signal, according to an embodiment.

In an embodiment, the wake up module 708 is configured to additionally receive an override signal and to generates the external control signal further based on the override signal. For example, the override signal indicates when the external control signal should turn the clock network 704 on irrespective of the busy indicator signal, and the wake up module 708 generates the external control signal to turn the clock network 704 on irrespective of the busy indicator signal when indicated by the override signal, according to an embodiment. As another example, the override signal indicates when the external control signal should turn the clock network 704 off irrespective of the busy indicator signal, and the wake up module 708 generates the external control signal to turn the clock network 704 off irrespective of the busy indicator signal when indicated by the override signal, according to an embodiment.

In an embodiment, the wake up module 712 is configured to additionally receive an override signal (the same as or different than the override signal provided to the wake up module 708) and to generates the local control signal further based on the override signal. For example, the override signal indicates when the local control signal should turn the clock network 704 on irrespective of the local busy indicator signal, and the wake up module 712 generates the local control signal to turn the clock network 704 on irrespective of the local busy indicator signal when indicated by the override signal, according to an embodiment. As another example, the override signal indicates when the local control signal should turn the clock network 704 off irrespective of the local busy indicator signal, and the wake up module 712 generates the local control signal to turn the clock network 704 off irrespective of the local busy indicator signal when indicated by the override signal, according to an embodiment.

Figure 8:
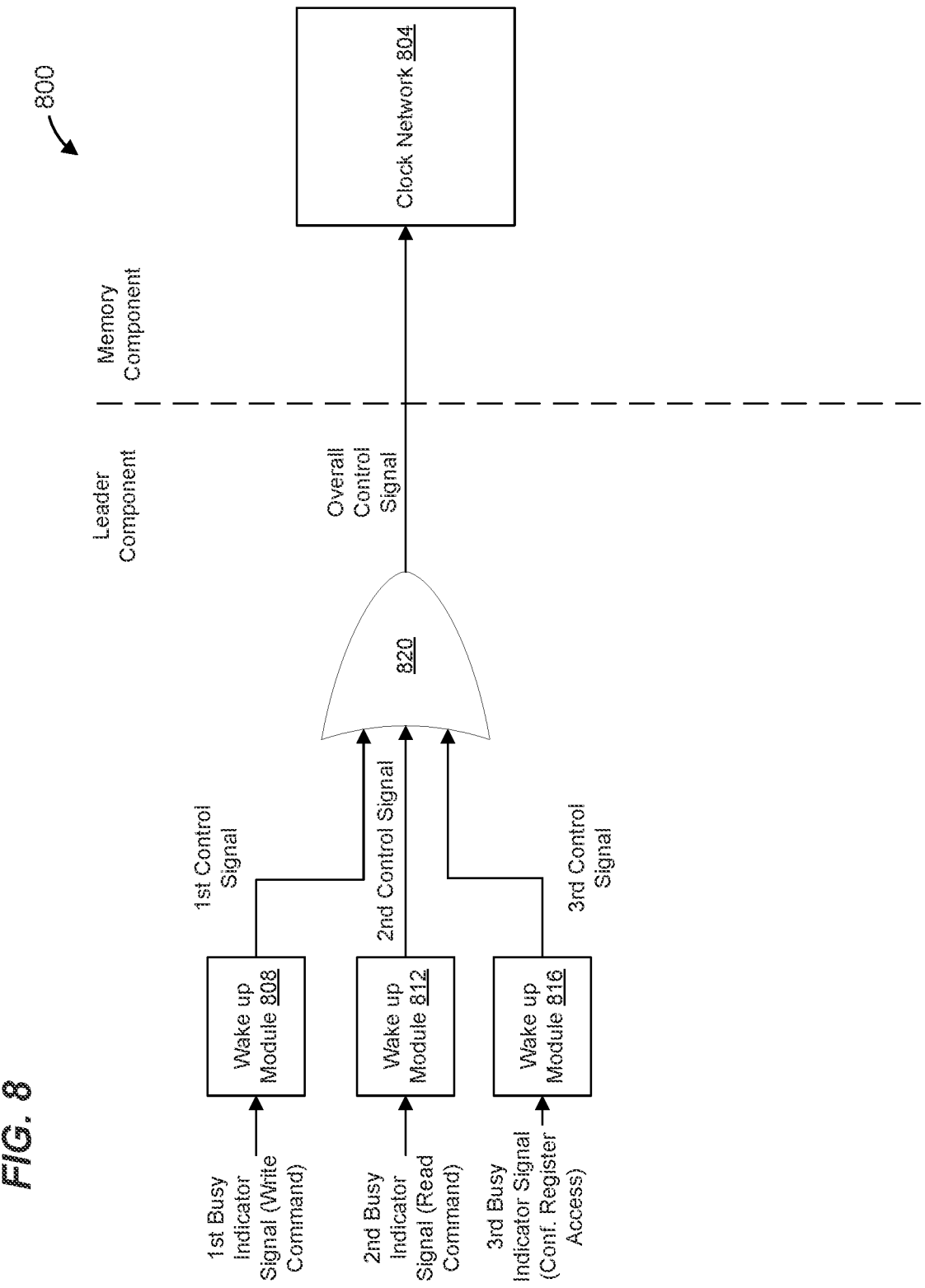
FIG. 8 is a simplified block diagram illustrating another example use of wake up modules in components of a network device, according to another embodiment.

FIG. 8 is a simplified block diagram 800 illustrating another example use of wake up modules in components of a network device, according to another embodiment. The network device is a switch, a router, etc., according to various embodiments. The network device is the network device 200 of FIG. 2, in an embodiment. The network device is another suitable network device different than the network device 200 of FIG. 2, in an embodiment.

In FIG. 8, a dashed vertical line indicates a division between a first component ("leader component") of the network device and a second component ("memory component") of the network device. In an embodiment, the leader component writes packet data to the memory component and reads packet data from the memory component. In another embodiment, the leader component also accesses one or more configuration registers of the memory component.

The memory component is the ingress buffer memory 224 or the egress buffer memory 252, and the leader component is the ingress arbiter circuitry 220 or the traffic manager circuitry 248, respectively, according to some embodiments.

The memory component includes a clock network 804, and the leader component includes a plurality of wake up modules 808, 812, 816, each configured to generate, based on a respective busy indicator signal generated by the leader component, a respective control signal for selectively activating and deactivating the clock network 804.

The wake up module 808 receives a first busy indicator signal that indicates when a write command is being sent by the leader component to the memory component. In an embodiment, the memory component will take a known first time duration to complete a write command, whereas the first busy indicator signal indicates a busy status in for a significantly shorter time duration in connection with the write command. In such embodiments, the wake up module 808 is configured to generate, in response to the first busy indicator signal, the first control signal to indicate the clock network 804 should be turned on for at least the first time duration.

The wake up module 812 receives a second busy indicator signal that indicates when a read command is being sent by the leader component to the memory component. In an embodiment, the memory component will take a known second time duration (different than the first time duration) to complete a read command, whereas the second busy indicator signal indicates a busy status in for a significantly shorter time duration in connection with the read command. In such embodiments, the wake up module 812 is configured to generate, in response to the second busy indicator signal, the second control signal to indicate the clock network 804 should be turned on for at least the second time duration.

The wake up module 816 receives a third busy indicator signal that indicates when a request to access a configuration register of the memory component is being sent by the leader component to the memory component. In an embodiment, the memory component will take a known third time duration (different than the first time duration and the second time duration) to complete a configuration register access request, whereas the third busy indicator signal indicates a busy status in for a significantly shorter time duration in connection with the configuration register access command. In such embodiments, the wake up module 816 is configured to generate, in response to the third busy indicator signal, the third control signal to indicate the clock network 804 should be turned on for at least the third time duration.

The leader component also includes logic circuitry 820, such as an OR gate or other suitable logic circuitry, that is configured to generate an overall control signal based on the first control signal, the second control signal, and the third control signal. For example, the logic circuitry 820 is configured to generate the overall control signal to turn on the clock network 804 when any one or more of the first control signal, the second control signal, and the third control signal indicate that the clock network 804 should be on.

In some embodiments, such as embodiments in which the leader component does not access configuration registers of the memory component, the wake up module 816 is omitted and the logic circuitry 820 is configured to generate the overall control signal to turn on the clock network 804 when one or both of the first control signal and the second control signal indicate that the clock network 804 should be on.

In some other embodiments, one or more example techniques described with reference to FIG. 7 are combined with the examples described with reference to FIG. 8. For example, the memory component of FIG. 8 includes a wake up module and logic circuitry similar to the wake up module 712 and the logic circuitry 720 of FIG. 7, in another embodiment. As another example, one or more wake up modules in the leader component and/or the memory component of FIG. 8 receive one or more override signals similar to the wake up modules of FIG. 7, in some embodiments.

Referring again to FIG. 2, in some embodiments a memory such as the ingress buffer memory 224 and the egress buffer memory 252 comprises a plurality of segments, such as memory banks, where each segment can be accessed separately. In some such embodiments, each segment includes a separate clock network that can be separately activated and deactivated. In some such embodiments, a component that accesses the memory generates respective control signals (e.g., using respective wake up modules and/or respective sets of multiple wake up modules such as in the embodiments discussed with respect to FIG. 8) to separately activate and deactivate respective segments of the memory that are being accessed.

Figure 9:
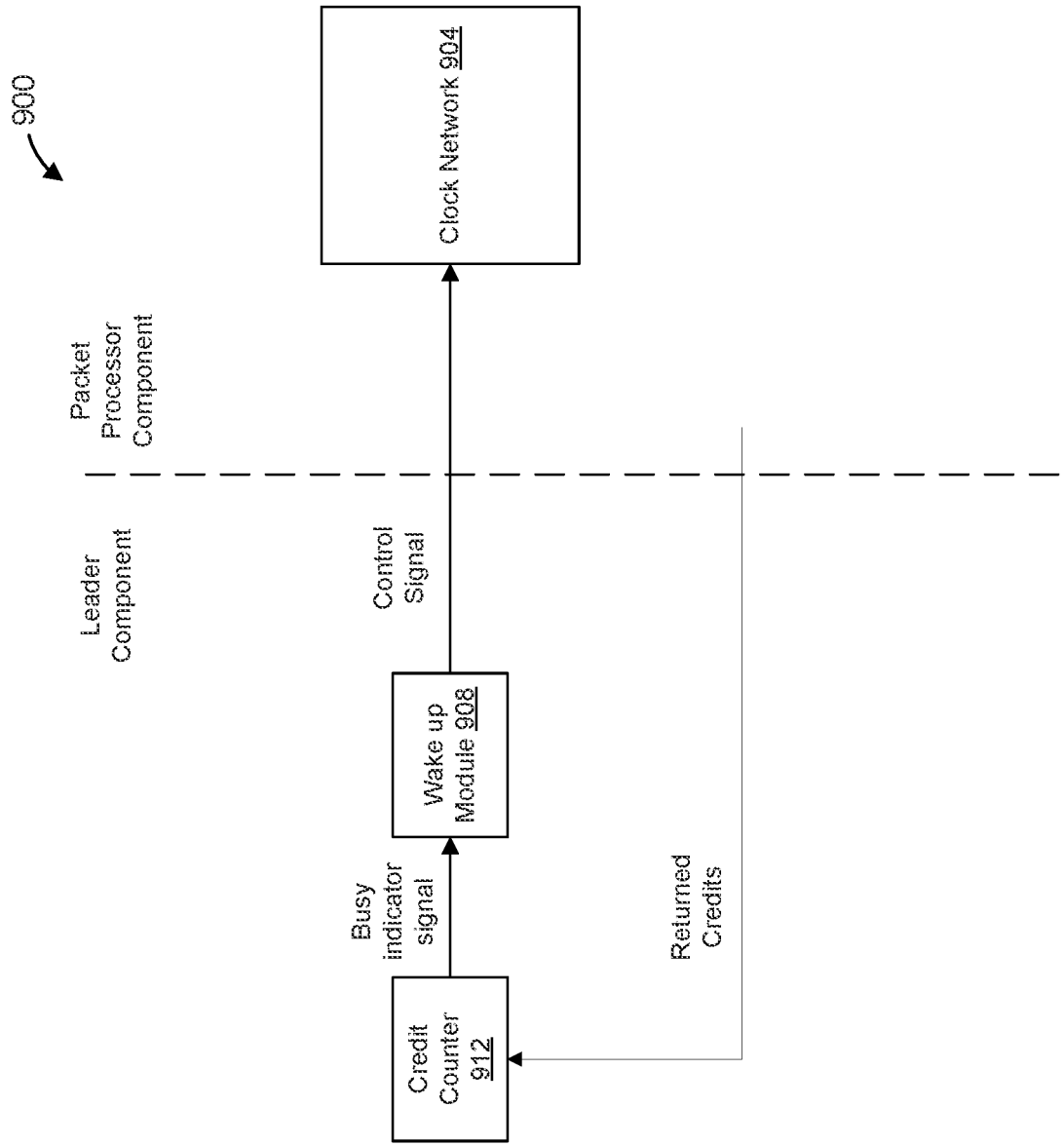
FIG. 9 is a simplified block diagram illustrating another example use of wake up modules in components of a network device, according to another embodiment.

FIG. 9 is a simplified block diagram 900 illustrating another example use of wake up modules in components of a network device, according to another embodiment. The network device is a switch, a router, etc., according to various embodiments. The network device is the network device 200 of FIG. 2, in an embodiment. The network device is another suitable network device different than the network device 200 of FIG. 2, in an embodiment.

In FIG. 9, a dashed vertical line indicates a division between a first component ("leader component") of the network device and a second component ("packet processor component") of the network device. In an embodiment, the leader component provides packet data to the packet processor component for processing by the packet processor component.

The packet processor component is the ingress packet processor 232, the egress packet processor 268, or the egress arbiter circuitry 272, and the leader component is the ingress arbiter circuitry 220 or the traffic manager circuitry 248, according to some embodiments.

The packet processor component includes a clock network 904, and the leader component includes a wake up module 908 configured to generate, based on a busy indicator signal generated by the leader component, a control signal for selectively activating and deactivating the clock network 904.

The leader component also includes a credit counter 912 that generates the busy indicator signal. The packet processor component provides to the leader component credits that indicate an availability of the packet processor to process packet data. In an embodiment, a quantity of credits generally corresponds to an amount of packet data that the packet processor component is available to process. When the leader component provides an amount of packet data to the packet processor component, the credit counter 912 decrements by a quantity of credits that corresponds to the amount of packet data that was provided to the packet processor component. When the packet processor component has completed processing an amount of packet data, the packet processor component sends a signal to the leader component that indicates a quantity of returned credits that indicates the amount of packet data that the packet processor component completed processing and/or an amount of packet data that the packet processor component is available to process. In response to receiving the signal that indicates the quantity of returned credits, the credit counter 912 increments by the quantity of returned credits.

In an embodiment, when the value of the credit counter is at a particular value (e.g., a maximum credits value or another suitable value), this indicates that the packet processor component is idle. In such embodiments, the credit counter 912 is configured to generate the control signal to indicate the clock network 904 should be i) turned on when the credit count is not at the particular value (e.g., the maximum credits value or another suitable value), and ii) turned off when the credit count is at the particular value (e.g., the maximum credits value or another suitable value).

The wake up module 908 receives the busy indicator signal from the credit counter 912 and uses the busy indicator signal to generate the control signal. In an embodiment, the busy indicator signal accurately indicates when the packet processor component is busy and when the packet processor component is idle, e.g., the packet processor component does not remain busy for a time period after the busy indicator signal indicates the packet processor component is idle. Therefore, the wake up module 908 is configured to generate the control signal without regard to a minimum time period for which the clock network 904 should be turned on, according to an embodiment.

In some other embodiments, one or more example techniques described with reference to FIG. 7 are combined with the examples described with reference to FIG. 9. For example, the packet processor component of FIG. 9 includes a wake up module and logic circuitry similar to the wake up module 712 and the logic circuitry 720 of FIG. 7, in another embodiment. As another example, one or more wake up modules in the leader component and/or the packet processor component of FIG. 9 receive one or more override signals similar to the wake up modules of FIG. 7, in some embodiments.

Figure 10:
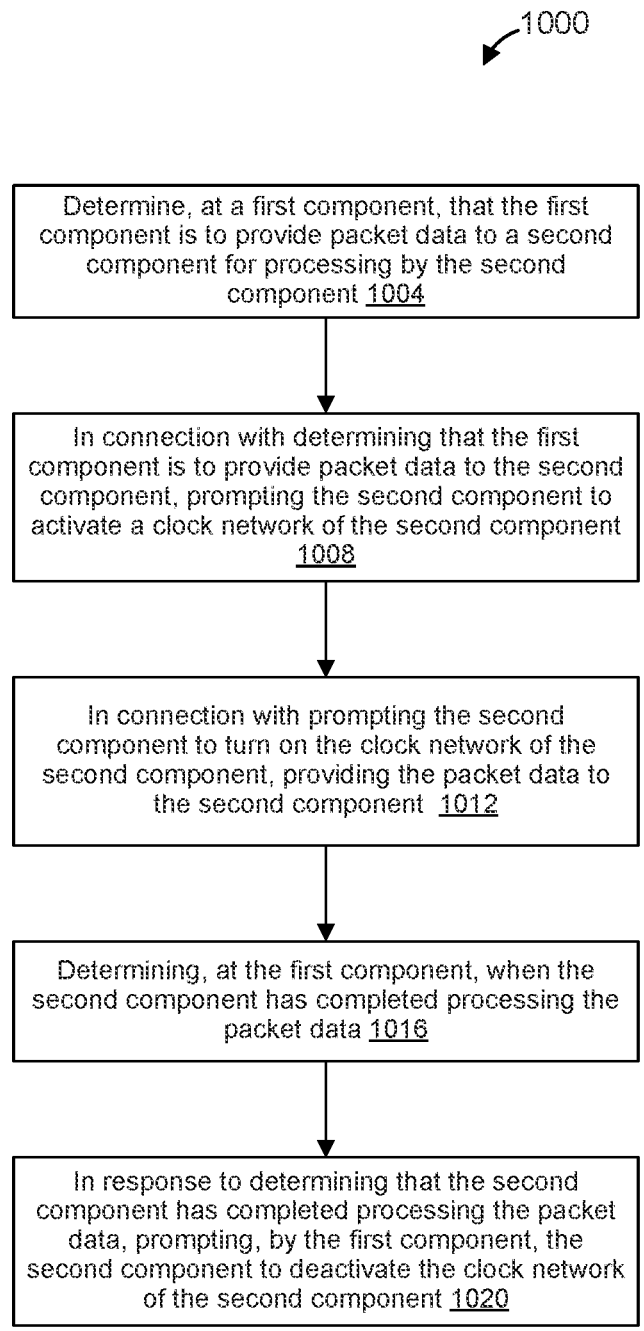
FIG. 10 is a flow diagram of another example method for power saving in a network device, according to another embodiment.

FIG. 10 is a flow diagram of another example method 1000 for power saving in a network device, according to another embodiment. The method 1000 is implemented using the wake up module 400 of FIG. 4A, according to an embodiment. In other embodiments, the method 1000 is implemented using another suitable wake up module different than the wake up module 400. In an embodiment, the method 1000 is implemented using a state machine described with reference to FIG. 5. In other embodiments, the method 1000 is implemented according to another suitable state machine.

The method 1000 is implemented by the network device 200 of FIG. 2, according to an embodiment, and the method 1000 is described with reference to FIG. 2 for ease of explanation. In other embodiments, the method 1000 is implemented by another suitable network device different than the network device 200.

At block 1004, a first component of the network device determines that the first component is to provide packet data to a second component of the network device for processing by the second component. For example, the first component determines that the first component is to provide packet data to a packet processor (the second component) for processing by the packet processor, in an embodiment. As another example, the first component determines that the first component is to provide packet data to a memory (the second component) for storage in the memory, in an embodiment.

At block 1008, in connection with determining at block 1004 that the first component is to provide packet data to the second component of the network device, the first component prompts the second component to activate a clock network of the second component. In an embodiment, a wake up module (such as described above) of the first component generates a control signal (such as described above) to prompt the second component to activate a clock network of the second component.

At block 1012, in connection with prompting the second component to activate the clock network, the first component sends the packet data to the second component to be processed by the second component. For example, the first component sends the packet data to a packet processor (the second component) for processing by the packet processor, in an embodiment. As another example, the first component sends the packet data to a memory (the second component) for storage in the memory, in an embodiment.

At block 1016, the first component determines when the second component has completed processing of the packet data. For example, the first component determines when a packet processor (the second component) completed processing of the packet data provided to the packet processor at block 1012, in an embodiment. As another example, the first component determines when a memory (the second component) completes a write command for writing the to the memory the packet data provided to the memory at block 1012, according to another embodiment.

At block 1020, in response to determining that the second component has completed processing of the packet data, the first component prompts the second component to deactivate the clock network. In an embodiment, a wake up module (such as described above) of the first component generates a control signal (such as described above) to prompt the second component to deactivate a clock network of the second component.

In another embodiment, the method 1000 further comprises starting at a timer of the first component in connection with sending the packet data to the second component; and determining when the second component has completed processing of the packet data at block 1016 comprises determining that the second component has completed processing of the packet data in connection with the timer expiring.

In another embodiment, the second component is a memory device; wherein sending the packet data from the first component to the second component is performed in connection with a write command from the first component to the memory device to write the data to the memory device; wherein starting the timer of the first component is performed in connection with sending the write command to the memory device; and wherein determining that the second component has completed processing of the data in connection with the timer expiring comprises determining that the memory device has completed writing the data in connection with the timer expiring.

In another embodiment, the method 1000 further comprises receiving a signal from the second component that indicates an availability of the second component to process packet data; wherein determining when the second component has completed processing of the packet data at block 1016 comprises using the signal from the second component that indicates an availability of the second component to process packet data.

In another embodiment, the method 1000 further comprises maintaining, at the first component, a credit counter to measure an availability of the second component to process packet data; wherein determining when the second component has completed processing of the packet data at block 1016 comprises using the credit counter.

Figure 11:
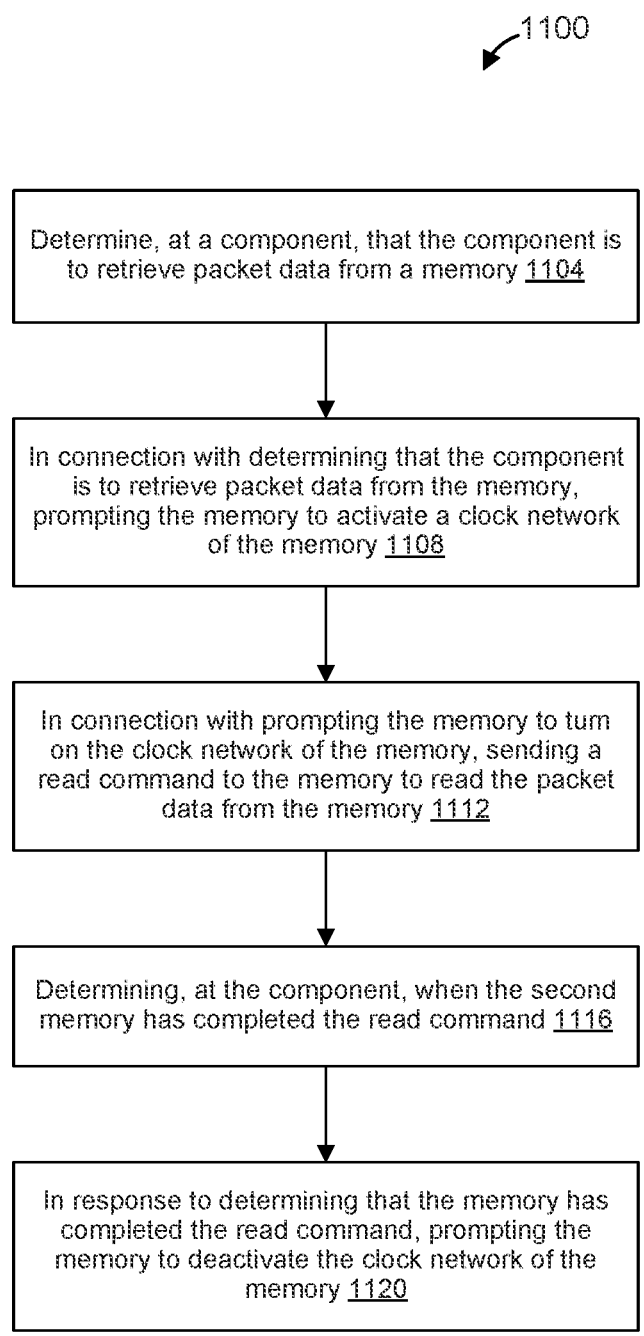
FIG. 11 is a flow diagram of another example method for power saving in a network device, according to another embodiment.

FIG. 11 is a flow diagram of another example method 1100 for power saving in a network device, according to another embodiment. The method 1100 is implemented using the wake up module 400 of FIG. 4A, according to an embodiment. In other embodiments, the method 1100 is implemented using another suitable wake up module different than the wake up module 400. In an embodiment, the method 1100 is implemented using a state machine described with reference to FIG. 5. In other embodiments, the method 1100 is implemented according to another suitable state machine.

The method 1100 is implemented by the network device 200 of FIG. 2, according to an embodiment, and the method 1100 is described with reference to FIG. 2 for ease of explanation. In other embodiments, the method 1100 is implemented by another suitable network device different than the network device 200.

At block 1104, a component of the network device determines that the component is to retrieve packet data stored in a memory of the network device.

At block 1108, in connection with determining that the component is to is to retrieve packet data stored in the memory of the network device, the component prompts the memory to activate a clock network of the memory. In an embodiment, a wake up module (such as described above) of the component generates a control signal (such as described above) to prompt the memory to activate a clock network of the memory.

At block 1112, in connection with prompting the memory to activate the clock network, the component sends a read command to the memory to be processed by the memory.

At block 1116, the component determines when the memory has completed processing of the read command.

At block 1120, in response to determining that the memory has completed processing of the read command, the component prompts the memory to deactivate the clock network.

In an embodiment, the method 1100 further comprises starting a timer of the component in connection with sending the read command to the memory; wherein determining when the memory has completed processing of the read command comprises determining that the memory has completed processing of the read command in connection with the timer expiring.

At least some of the various blocks, operations, and techniques described above are suitably implemented utilizing dedicated hardware, such as one or more of discrete components, an integrated circuit, an ASIC, a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as in a random access memory (RAM), a read-only memory (ROM), a solid state memory, etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for power saving in a network device, the method comprising:
   determining, at a first component implemented on an integrated circuit (IC) chip of the network device, that the first component is to provide packet data to a second component implemented on the IC chip of the network device for processing by the second component;
   in connection with determining that the first component is to provide packet data to the second component of the network device, prompting, by the first component, the second component to activate a clock network of the second component;
   in connection with prompting the second component to activate the clock network, sending the packet data from the first component to the second component to be processed by the second component;
   determining, at the first component, when the second component has completed processing of the packet data; and
   in response to determining that the second component has completed processing of the packet data, prompting, by the first component, the second component to deactivate the clock network.

2. The method of claim 1, further comprising:
   starting at a timer of the first component in connection with sending the packet data to the second component;
   wherein determining when the second component has completed processing of the packet data comprises determining that the second component has completed processing of the packet data in connection with the timer expiring.

3. The method of claim 2, further comprising:
   retrieving from a memory an indication of a time period corresponding to a time required by the second component to perform a packet data processing function; and
   in connection with retrieving the indication of the time period from the memory, configuring the timer to measure the time period.

4. The method of claim 2, wherein:
   the second component is a memory device;
   sending the packet data from the first component to the second component is performed in connection with a write command from the first component to the memory device to write the packet data to the memory device;
   starting the timer of the first component is performed in connection with sending the write command to the memory device; and
   determining that the second component has completed processing of the packet data in connection with the timer expiring comprises determining that the memory device has completed writing the packet data in connection with the timer expiring.

5. The method of claim 1, further comprising:
   receiving, at the first component, a signal from the second component that indicates an availability of the second component to process packet data;
   wherein determining when the second component has completed processing of the packet data comprises determining that the second component has completed processing of the data using the signal from the second component that indicates an availability of the second component to process packet data.

6. The method of claim 1, further comprising:
   maintaining, at the first component, a credit counter to measure an availability of the second component to process packet data;
   wherein determining when the second component has completed processing of the packet data comprises determining that the second component has completed processing of the data using the credit counter.

7. A method for power saving in a network device, the method comprising:
   determining, at a component implemented on an integrated circuit (IC) of the network device, that the component is to retrieve packet data stored in a memory implemented on the IC of the network device;
   in connection with determining that the component is to is to retrieve packet data stored in the memory of the network device, prompting, by the component, the memory to activate a clock network of the memory;
   in connection with prompting the memory to activate the clock network, sending a read command from the component to the memory to be processed by the memory;
   determining, at the component, when the memory has completed processing of the read command; and
   in response to determining that the memory has completed processing of the read command, prompting, by the component, the memory to deactivate the clock network.

8. The method of claim 7, further comprising:
   starting at a timer of the first component in connection with sending the read command to the memory;
   wherein determining when the memory has completed processing of the read command comprises determining that the memory has completed processing of the read command in connection with the timer expiring.

9. The method of claim 8, wherein the memory is a first memory and wherein the method further comprises:
   retrieving from a second memory configuration information that includes an indication of a time period corresponding to a time required by the first memory to execute the read command; and in connection with retrieving the configuration information that includes the indication of the time period from the second memory, configuring the timer to measure the time period.

10. The method of claim 8, wherein the memory is a first memory and wherein the method further comprises:
retrieving from a second memory configuration information that includes an indication that a control signal for controlling activation and deactivation of the clock network is to be generated based on the timer expiring; and
generating the control signal is in response to the configuration information that includes the indication that the control signal is to be generated based on the timer expiring.

11. A network device, comprising:
a memory configured to store packet data corresponding to packets received via a plurality of network interfaces of the network device;
a packet processor configured to process packets received via the plurality of network interfaces of the network device, the packet processor including a clock network; and
circuitry configured to:
manage queues in the memory,
selectively release to the packet processor packet data in queues in the memory for processing by the packet processor,
in connection with determining that packet data is to be released to the packet processor, prompt the packet processor to activate the clock network of the packet processor,
in connection with prompting the packet processor to activate the clock network, releasing the packet data to the packet processor,
determine when the packet processor has completed processing of the packet data, and
in response to determining that the packet processor has completed processing of the packet data, prompt the packet processor to deactivate the clock network.

12. The apparatus of claim 11, wherein:
the packet processor is configured to generate a signal that indicates an availability of the packet processor to process packet data; and
the circuitry is configured to determine that the packet processor has completed processing of the packet data using the signal from the packet processor that indicates the availability of the packet processor to process packet data.

13. The apparatus of claim 11, wherein:
the packet processor is configured to use a credit mechanism to inform the circuitry of an availability of the packet processor to process packet data;
the circuitry includes a counter configured to count credits corresponding to the credit mechanism used by the packet processor; and
the circuitry is configured to determine that the packet processor has completed processing of the packet data using the counter.

14. The apparatus of claim 11, wherein the clock network is a first clock network, and wherein the circuitry is further configured to:
issue memory access commands to the memory corresponding to reading packet data from and writing packet data to the memory;
in connection with determining that a memory access command is to be issued to the memory, prompt the memory to activate a second clock network of the memory;
in connection with prompting the memory to activate the second clock network, sending the memory access command to memory;
determine when the memory has completed processing of the memory access command; and
in response to determining that the memory has completed processing of the memory access command, prompt the memory to deactivate the second clock network.

15. The apparatus of claim 14, wherein:
the circuitry includes a timer; and
the circuitry is configured to:
start the timer in connection with sending the memory access command to the memory, and
determine when the memory has completed processing of the memory access command in connection with the timer expiring.

16. The apparatus of claim 15, wherein:
the memory is a first memory;
the circuitry includes a second memory configured to store configuration information regarding the second clock network of the first memory; and
the circuitry is configured to:
retrieve from the second memory configuration information that includes an indication of a time period corresponding to a time required by the first memory to execute the memory access command, and
in connection with retrieving the configuration information that includes the indication of the time period from the second memory, configure the timer to measure the time period.

17. The apparatus of claim 16, wherein:
the timer is a first timer;
the circuitry includes a second timer associated with generating a first control signal to prompt the packet processor to deactivate the first clock network of the packet processor;
the circuitry includes a third memory configured to store configuration information regarding the first clock network of the packet processor; and
the circuitry is configured to:
retrieve from the third memory configuration information that includes an indication that the circuitry is to disregard the second timer when generating the first control signal,
in response to the indication that the circuitry is to disregard the second timer when generating the first control signal, generate the first control signal to prompt the packet processor to deactivate the first clock network of the packet processor without regard to the second timer,
retrieving from the second memory configuration information that includes an indication that the circuitry is to generate a second control signal for controlling deactivation of the second clock network of the first memory based on the first timer expiring, and
in response to the indication that the circuitry is to generate the second control signal based on the first timer expiring, generate the second control signal based on the first timer expiring.

18. The apparatus of claim 15, wherein:
the memory access command is a read command;

the timer is a first timer configured to measure a first time duration corresponding to executing the read command;

the circuitry includes a second timer configured to measure a second time duration corresponding to executing a write command;

the first time duration is different than the second time duration;

the circuitry is configured to:

in connection with determining that the read command is to be issued to the memory, prompt the memory to activate the second clock network of the memory, in connection with prompting the memory to activate the second clock network, sending the read command to memory, start the first timer in connection with sending the read command to the memory, determine when the memory has completed processing of the read command in connection with the first timer expiring, in response to determining that the memory has completed processing of the read command, prompt the memory to deactivate the second clock network, in connection with determining that a write command is to be issued to the memory, prompt the memory to activate the second clock network of the memory, in connection with prompting the memory to activate the second clock network, sending the write command to memory, start the second timer in connection with sending the write command to the memory, determine when the memory has completed processing of the write command in connection with the second timer expiring, in response to determining that the memory has completed processing of the write command, prompt the memory to deactivate the second clock network.

* * * * *